(12) United States Patent
Kumar et al.

(10) Patent No.: US 11,611,850 B2
(45) Date of Patent: *Mar. 21, 2023

(54) SYSTEMS AND METHODS FOR PRS MUTING IN A FIFTH GENERATION WIRELESS NETWORK

(71) Applicant: QUALCOMM Incorporated, San Diego, CA (US)

(72) Inventors: Akash Kumar, Hyderabad (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,752

(22) Filed: Nov. 12, 2021

(65) Prior Publication Data

US 2022/0070624 A1 Mar. 3, 2022

Related U.S. Application Data

(63) Continuation of application No. 16/933,843, filed on Jul. 20, 2020, now Pat. No. 11,228,867, which is a (Continued)

(30) Foreign Application Priority Data

Jul. 13, 2018 (IN) .............................. 201841026282

(51) Int. Cl.
*H04W 4/029* (2018.01)
*H04L 5/00* (2006.01)
(Continued)

(52) U.S. Cl.
CPC ............. *H04W 4/029* (2018.02); *H04L 5/005* (2013.01); *H04W 72/0446* (2013.01); *H04W 72/51* (2023.01); *H04W 72/541* (2023.01)

(58) Field of Classification Search
CPC .. H04W 4/029; H04W 72/048; H04W 72/082
See application file for complete search history.

(56) References Cited

U.S. PATENT DOCUMENTS 10,021,667 B2 7/2018 Akkarakaran et al.
10,779,126 B2 9/2020 Kumar et al.
(Continued)

FOREIGN PATENT DOCUMENTS

EP 2477349 A2 7/2012

OTHER PUBLICATIONS

International Search Report and Written Opinion—PCT/US2019/035421—ISA/EPO—dated Oct. 15, 2019.

(Continued)

*Primary Examiner* — Barry W Taylor
(74) *Attorney, Agent, or Firm* — Campbell Chiang; Weaver Austin Villeneuve & Sampson LLP

(57) ABSTRACT

Methods and techniques are described for supporting location services for a user equipment (UE) in a Fifth Generation wireless network in which a base station, such as a gNB or ng-eNB, broadcasts a Positioning Reference Signal (PRS) in a plurality of different directions and at a plurality of different times. A PRS muting configuration is used in which PRS is muted using a time based and angle based pattern to prevent interference between beams transmitted by other base stations and/or to prevent interference between beams transmitted simultaneously by a single base station. The time based and angle based muting pattern, for example, may provide an indication for each direction in the plurality of different directions and for each time in the plurality of different times and as to whether the PRS is transmitted or muted by the base station.

30 Claims, 14 Drawing Sheets

Related U.S. Application Data continuation of application No. 16/429,439, filed on Jun. 3, 2019, now Pat. No. 10,779,126.

(51) Int. Cl.
  *H04W 72/0446* (2023.01)
  *H04W 72/51* (2023.01)
  *H04W 72/541* (2023.01)

(56) References Cited

U.S. PATENT DOCUMENTS

| | | | |
|---|---|---|---|
| 11,228,867 B2* | 1/2022 | Kumar | H04L 5/005 |
| 2013/0040673 A1 | 2/2013 | Siomina et al. | |
| 2018/0098187 A1 | 4/2018 | Blankenship et al. | |
| 2018/0139763 A1 | 5/2018 | Bitra et al. | |
| 2019/0037529 A1 | 1/2019 | Edge et al. | |
| 2019/0245663 A1 | 8/2019 | Kim et al. | |
| 2019/0353746 A1* | 11/2019 | Razavi | G01S 5/0231 |
| 2020/0021946 A1 | 1/2020 | Kumar et al. | |
| 2020/0351621 A1 | 11/2020 | Kumar et al. | |

OTHER PUBLICATIONS

International Preliminary Report on Patentability—PCT/US2019/035421, The International Bureau of WIPO—Geneva, Switzerland, dated Jan. 28, 2021.

Johansson T., et al., "3GPP LTE Release 9 and 10 Requirement Analysis to Physical Layer UE Testing", Sep. 4, 2013, XP055190963, 114 pages, Retrieved from the Internet: URL: https://helda.helsinki.fi/bitstream/handle/10138/42301/thesis_Tomi_Johansson.pdf?sequence=3 [retrieved on May 21, 2015] chapter 4.2.1.1 chapter 4.2.3.1.

Xinwei: "Discussion on Indoor Positioning Enhancement Aided by EB/FD-MIMO", 3GPP Draft; R1-154700_Discussion on Indoor Positioning Enhancement Aided by EB FD-MIMO, 3rd Generation Partnership Project (3GPP), Mobile Competence Centre; 650, Route Des Lucioles; F-06921 Sophia-An, vol. RAN WG1, No. Beijing, China; Aug. 24, 2015-Aug. 28, 2015, Aug. 14, 2015, XP050993741, 3 Pages, Retrieved from the Internet: URL: http://www.3gpp.org/ftp/tsg_ran/WG1_RL1/TSGR1_82/Docs/ [retrieved on Aug. 14, 2015] the whole document.

* cited by examiner

PRS Time Occasions

|  | P0 | P1 | P2 | P3 | P4 | P5 | P6 | P7 |
|---|---|---|---|---|---|---|---|---|
| B0 | | | | | | | | |
| B1 | | | | | | | | |
| B2 | | | | 1 | | | 0 | |
| B3 | | | | | | | | |
| B4 | | | | | | | | |
| B5 | | | | | | | | |
| B6 | | | | | | | | |
| B7 | | | | | | | | |

Beam/AOD

SYSTEMS AND METHODS FOR PRS MUTING IN A FIFTH GENERATION WIRELESS NETWORK

CLAIM OF PRIORITY UNDER 35 U.S.C. § 119

This application is a continuation of U.S. Ser. No. 16/933,843, entitled "SYSTEMS AND METHODS FOR PRS MUTING IN A FIFTH GENERATION WIRELESS NETWORK," which was filed Jul. 20, 2020, which is continuation of U.S. Ser. No. 16/429,439, entitled "SYSTEMS AND METHODS FOR PRS MUTING IN A FIFTH GENERATION WIRELESS NETWORK," which was filed Jun. 3, 2019, now U.S. Pat. No. 10,779,126, issued on Sep. 15, 2020, and which claims under 35 USC § 119 the benefit of and priority to India Provisional Application No. 201841026282, filed Jul. 13, 2018, and entitled "SYSTEMS AND METHODS FOR PRS MUTING IN A FIFTH GENERATION WIRELESS NETWORK," both of which are assigned to the assignee hereof and are incorporated herein by reference in their entireties.

BACKGROUND

Background

The present disclosure relates generally to communication, and more specifically to techniques for supporting location services for user equipments (UEs) served by a Fifth Generation (5G) wireless network.

Relevant Background

It is often desirable to know the location of a user equipment (UE) such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

To assist in location determination, base stations (BS) may broadcast Positioning Reference Signals (PRS), which are used by UEs for downlink (DL) measurements, such as Reference Signal Time Difference (RSTD), an Angle of Arrival (AOA), an Angle of Departure (AOD), a Reference Signal Received Power (RSRP), and a Reference Signal Received Quality (RSRQ). For example, a UE may measure time differences in received PRS signals from a plurality of base stations for Observed Time Difference of Arrival (OTDOA) based positioning. Because the positions of the base stations are known, the observed time differences may be used to calculate the location of the UE. Typically, PRS signals transmitted in different nearby cells and sometimes within the same cell may interfere with another, resulting in less accurate and reliable PRS acquisition and measurement by UEs and thereby less accurate location estimation of UEs. To mitigate or avoid this, PRS signals may be periodically and differentially muted.

SUMMARY

Methods and techniques are described for supporting location services for a user equipment (UE) in a Fifth Generation wireless network in which a base station, such as a gNB or ng-eNB, broadcasts a Positioning Reference Signal (PRS) in a plurality of different directions and at a plurality of different times. A PRS muting configuration is used in which PRS is muted using a time based and angle based pattern to prevent interference between beams transmitted by other base stations and/or to prevent interference between beams transmitted simultaneously by a single base station. The time based and angle based muting pattern, for example, may provide an indication for each direction in the plurality of different directions and for each time in the plurality of different times and as to whether the PRS is transmitted or muted by the base station.

In one implementation, a method for supporting location services for a user equipment (UE) performed by a location server includes determining configuration parameters for a Positioning Reference Signal (PRS) transmitted by a base station, the configuration parameters comprising a muting configuration, the muting configuration comprising a time based and angle based muting pattern; generating assistance data for the UE based on the configuration parameters, the assistance data comprising the muting configuration; sending the assistance data to the UE; and receiving location information from the UE, wherein the location information is based on at least one location measurement for the PRS, wherein the at least one location measurement is based on the muting configuration.

In one implementation, a location server for supporting location services for a user equipment (UE) includes an external interface configured to communicate with a wireless network; at least one memory; and at least one processor coupled to the external interface and the at least one memory and configured to: determine configuration parameters for a Positioning Reference Signal (PRS) transmitted by a base station, the configuration parameters comprising a muting configuration, the muting configuration comprising a time based and angle based muting pattern; generate assistance data for the UE based on the configuration parameters, the assistance data comprising the muting configuration; send the assistance data to the UE via the external interface; and receive location information from the UE via the external interface, wherein the location information is based on at least one location measurement for the PRS, wherein the at least one location measurement is based on the muting configuration.

In an implementation, a method for supporting location services for a user equipment (UE) performed by the UE includes receiving assistance data from a location server based on a configuration parameters for a Positioning Reference Signal (PRS) transmitted by a base station, the configuration parameters comprising a muting configuration, the muting configuration comprising a time based and angle based muting pattern; generating location measurements comprising at least one location measurement for the PRS, wherein the at least one location measurement is based on the muting configuration; and sending location information to the location server for location determination of the UE, wherein the location information is based on the at least one location measurement.

In one implementation, a user equipment (UE) capable of supporting location services for the UE includes at least one wireless transceiver configured to wirelessly communicate with at least one wireless network; at least one memory; and at least one processor coupled to the at least one wireless transceiver and the at least one memory and configured to: receive via the wireless transceiver assistance data from a location server based on a configuration parameters for a Positioning Reference Signal (PRS) transmitted by a base station, the configuration parameters comprising a muting configuration, the muting configuration comprising a time based and angle based muting pattern; generate location measurements comprising at least one location measurement for the PRS, wherein the at least one location measurement is based on the muting configuration; and send via the at least one wireless transceiver location information to the location server for location determination of the UE, wherein the location information is based on the at least one location measurement.

In an implementation, a method for supporting location services for a user equipment (UE) performed by a base station includes generating configuration parameters for a Positioning Reference Signal (PRS) transmitted by the base station, the configuration parameters comprising a muting configuration, the muting configuration comprising a time based and angle based muting pattern; sending the configuration parameters for the PRS including the muting configuration to a location server; and broadcasting the PRS using the muting configuration comprising the time based and angle based muting pattern.

In one implementation, a base station capable of supporting location services for a user equipment (UE) includes an external interface configured to communicate with a wireless network and to wirelessly broadcast signals; at least one memory; and at least one processor coupled to the external interface and the at least one memory and configured to: generate configuration parameters for a Positioning Reference Signal (PRS) transmitted by the base station, the configuration parameters comprising a muting configuration, the muting configuration comprising a time based and angle based muting pattern; send via the external interface the configuration parameters for the PRS including the muting configuration to a location server in the wireless network; and broadcast via the external interface the PRS using the muting configuration comprising the time based and angle based muting pattern.

BRIEF DESCRIPTION OF THE DRAWINGS

An understanding of the nature and advantages of various embodiments may be realized by reference to the following figures.

Figure 1:
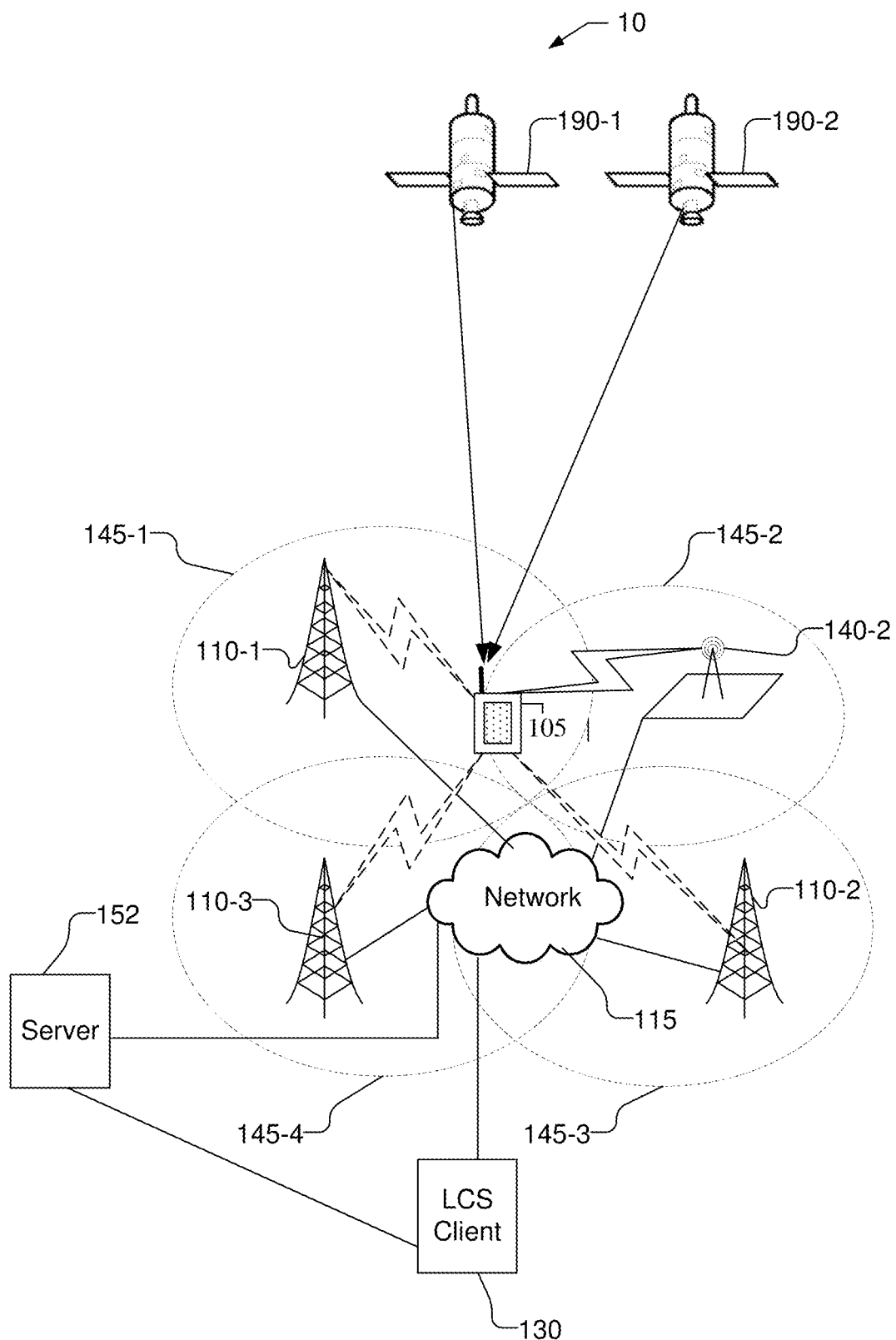
FIG. 1 shows an architecture of a system capable of providing location services to a User Equipment.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as either 110-1, 110-2, 110-3 etc. or 110A, 110B, 110C etc. When referring to such an element using only the first number, any instance of the element is to be understood (e.g. elements 110 in the previous example may refer to elements 110-1, 110-2 and 110-3 or elements 110A, 110B and 110C).

DETAILED DESCRIPTION

In location determination, such as Observed Time Difference of Arrival (OTDOA) based positioning, the UE may measure time differences in received signals from a plurality of base stations. Because positions of the base stations are known, the observed time differences may be used to calculate the location of the UE. In OTDOA, the UE measures the time of arrival (TOA) of signals from a reference cell (e.g., the serving cell) and from one or more neighboring cells. The TOA from the reference cell may be subtracted from the TOA from each of the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated (e.g. using multilateration techniques).

Positioning Reference Signals (PRS) are broadcast by base stations and are used by UEs for positioning in Long Term Evolution (LTE) networks, where the UE measures the TOA (Time of Arrival) metric of different cells, obtains RSTDs between a reference cell and each of one or more neighbor cells, and reports the RSTDs to a network location server. The location server (LS) may use the reported measurements to generate a fix for the position of the UE (e.g. using multilateration). PRS signals are typically transmitted at higher power than Cell specific Reference Signals (CRS) to have higher hearability. Consequently, the PRS signals transmitted from one cell may interfere with the PRS signals from neighboring cells if using the same frequencies (e.g. same REs). In order to maintain good detectability in such scenarios, the PRS of one cell (e.g. a "cell A") may be muted, i.e., the PRS is sometimes transmitted at zero power so that the PRS from another cell (e.g. a "cell B") can be detected by the UE with less interference. In order to detect PRS from all cells, the muting of different cells is typically distinct. For example, at a time T1, PRS from cell A is muted while PRS from cell B is not, whereas at another time T2, PRS from cell B is muted while PRS from cell A is not. This illustrates differential muting with respect to time. However, other types of differential muting are also possible such as with respect to angle of transmission, as described later.

In legacy LTE, such as 4G LTE, as defined by the Third Generation Partnership Project (3GPP), the muting sequence for the PRS is defined as a periodic pattern with a certain defined periodicity $T_{REP}$, which is counted in number of PRS positioning occasions or PRS positioning groups, which can be a power of two (e.g. 2, 4, 8, 16, 32, up to 1024) corresponding to a selected periodicity $T_{REP}$. The muting information is hence specified as a string of bits of length $T_{REP}$ and each bit can have a value '0' or '1'. If the bit the PRS muting info is set to zero ('0'), PRS is muted in that positioning occasion or positioning group. For LTE, PRS is assumed to be transmitted by a base station throughout its cell coverage area. Accordingly, PRS muting is strictly time based, with consecutive PRS positioning occasions (or positioning groups) being either transmitted at high power or muted (equivalent to transmission at zero power) according to the muting pattern.

In a Fifth Generation (5G) wireless network, as being defined by 3GPP, PRS may not be transmitted simultaneously throughout the cell coverage area. For 5G New Radio (NR), positioning signals (e.g. PRS) may be transmitted directionally, such that a transmission spans a narrow range of angles (e.g. 5 degrees of azimuth) using a "directional beam." Further, the direction of transmission of the positioning signal may change with time. For example, a directional beam may be rotated through 120 degrees for a cell sector or 360 degrees for an omnidirectional cell, with the rotation periodically repeated. Moreover, multiple directional beams may be transmitted at the same time in several different directions and the directions of transmission may change with time.

Consequently, in 5G NR, directional beams from different nearby cells may only intersect and thereby potentially interfere with each other at certain locations and at certain limited times. The locations of intersection (and thus the potential interference) may change with time as each intersecting directional beam changes transmission direction. To reduce interference in these cases, it may not be necessary or efficient to mute PRS transmission based on a conventional time based pattern because the intersection of beams and hence interference may not always occur based solely on times of PRS transmission. Accordingly, the use of a conventional muting sequence for PRS in a 5G wireless network may be wasteful and not appropriate. Instead, muting may be based on either angle (i.e. direction) of transmission or on both angle of transmission and time as described herein.

FIG. 1 shows an architecture of a system 10 capable of providing location services to UE 105 including the transfer of location assistance data, including PRS configurations of base stations, or location information, using messages such as Long Term Evolution (LTE) Positioning Protocol (LPP) or LPP extensions (LPPe) messages between a UE 105 and a server 152, which, in some instances, may take the form of a location server or another network entity and is referred to here as a location server. The transfer of the location information may occur at a rate appropriate to both UE 105 and location server 152. LPP is well-known and described in various publicly available technical specifications from 3GPP. LPPe has been defined by the Open Mobile Alliance (OMA) and may be used in combination with LPP such that each combined LPP/LPPe message would be an LPP message comprising an embedded LPPe message.

Figure 2:
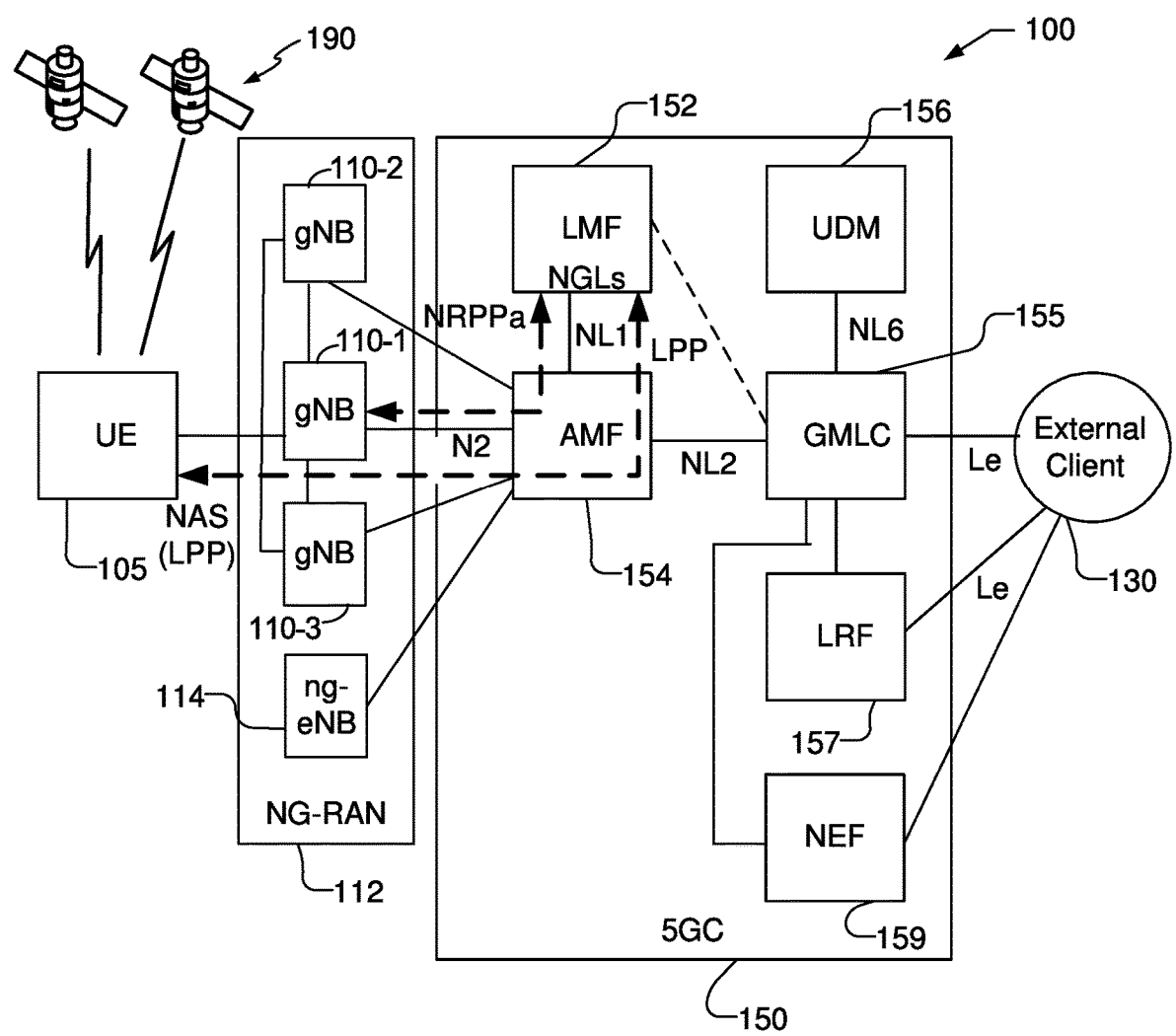
FIG. 2 is a block diagram illustrating a non-roaming reference architecture for UE location determination using time based and angle based muting of PRS transmitted by the base stations.

For simplicity, only one UE 105 and location server 152 are shown in FIG. 2. In general, system 100 may comprise multiple cells indicated by 145-$k$ ($0 \le k \le N_{cells}$, where $N_{cells}$ is the number of cells) with one or more networks 115, external clients 130, UEs 105, base stations 110 with antennas, and Space Vehicles (SVs) 190. System 100 may further comprise a mix of cells including macrocells such as cells 145-1, 145-3, and 145-4 along with femtocells such as cell 145-2 in a manner consistent with embodiments disclosed herein.

UE 105 may be capable of wirelessly communicating with location server 152 through network 115 (or through multiple networks 115) that support positioning and location services. For example, location services (LCS) may be performed on behalf of LCS Client 130, sometimes referred to as an external client 130, that accesses location server 152 and/or network 115 and issues a request for the location of UE 105. Location server 152 or network 115 may then respond to LCS client 130 with a location estimate for UE 105. LCS Client 130 may also be known as a Secure User Plane Location (SUPL) Agent—e.g. when the location solution used by location server 152 and UE 105 is the SUPL solution defined by OMA. In some embodiments, UE 105 may also include an LCS Client or a SUPL agent that may issue a location request to some positioning capable function within UE 105 and later receive back a location estimate for UE 105. The LCS Client or SUPL Agent within UE 105 may perform location services for the user of UE 105—e.g. provide navigation directions or identify points of interest within the vicinity of UE 105.

As illustrated in FIG. 1, the UE 105 may communicate with location server 152 through network 115 and base stations 110, which may be associated with network 115. UE 105 may receive and measure signals from antennas for base stations 110, which may be used for position determination. For example, UE 105 may receive and measure signals from antennas for one or more of base stations 110-1, 110-2, 110-3 and/or 110-4, which may be associated with cells 145-1, 145-2, 145-3 and 145-4, respectively. In some embodiments, base stations 110 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

UE 105 may also receive signals from one or more Earth orbiting Space Vehicles (SVs) 190-1 or 190-2 collectively referred to as SVs 190, which may be part of a satellite positioning system (SPS). SVs 190, for example, may be in a constellation of Global Navigation Satellite System (GNSS) such as the US Global Positioning System (GPS), the European Galileo system, the Russian Glonass system or the Chinese BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

FIG. 2 is a simplified block diagram illustrating a communication system 100 for non-roaming support of UE 105 location using time based and angle based muting of PRS transmitted by the base stations 110. Communication system 100 may be one example of the system 10 in FIG. 1. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GC) 150 that is in communication with an external client 130. A 5G network may also be referred to as a New Radio (NR) network; NG-RAN 112 may be referred to as an NR RAN or a 5G RAN; and 5GC 150 may be referred to as an Next Generation (NG) Core network (NGC). As an example, NG-RAN 112 may include one or more next generation eNBs (ng-eNBs) 114 which provide LTE wireless access to UE 105. Standardization of an NG-RAN and 5GC has been performed by 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, ng-eNBs 114, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), IEEE 802.11 WiFi etc.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GC 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 150 not shown in FIG. 2, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110 or ng-eNB 114. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellites 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110 or ng-eNB 114). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured by UE 105 relative to three or more terrestrial transmitters (e.g. gNBs 110) fixed at known locations or relative to four or more satellites 190 with accurately known orbital data, or combinations thereof, based at least in part, on pilots, positioning reference signals (PRS) or other positioning related signals transmitted by the transmitters or satellites and received at the UE 105. Here, a location server, such as the LMF 152, may be capable of providing positioning assistance data to UE 105 including, for example, information regarding signals to be measured (e.g., expected signal timing, signal coding, signal frequencies, signal Doppler, muting configuration), locations and identities of terrestrial transmitters (e.g. gNBs 110) and/or signal, timing and orbital information for GNSS satellites 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, location servers may comprise an almanac which indicates locations and identities of cellular transceivers and/or local transceivers in a particular region or regions such as a particular venue, and may provide information descriptive of signals transmitted by a cellular base station or access point (AP) (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi AP). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110 or ng-eNB 114) in NG-RAN 112 to determine a location for UE 105.

The UE 105 may measure one or more of a Reference Signal Time Difference (RSTD), a Receive-Transmit (Rx-Tx) time difference, an Angle of Arrival (AOA), a Round Trip signal propagation Time (RTT), an Angle of Departure (AOD), a Reference Signal Strength Indication (RSSI), a Reference Signal Received Power (RSRP), a Reference Signal Received Quality (RSRQ). For example, in the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and/or base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 2, pairs of gNBs 110 in NG-RAN 112 may be connected to one another, e.g., directly as shown in FIG. 2 or indirectly via other gNBs 110. Access to the 5G network is provided to UE 105 via wireless communication between the UE 105 and one or more of the gNBs 110, which may provide wireless communication access to the 5GC 150 on behalf of the UE 105 using 5G (e.g. NR). In FIG. 2, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 2 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 2 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GC 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location services requests for the UE 105, e.g., received from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using measurements of signals transmitted by wireless nodes, and assistance data provided to the UE 105). The LMF 152 may be referred to by other names such as a Location Manager (LM), Location Function (LF), commercial LMF (CLMF) or value added LMF (VLMF).

The GMLC 155 may support a location request for the UE 105 received from an external client 130 and may forward such a location request to the AMF 154, which may in turn forward the location request to the LMF 152. A location response from the LMF 152 (e.g. containing a location estimate for the UE 105) may be similarly returned to the GMLC 155 via the AMF 154, and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

As further illustrated in FIG. 2, the LMF 152 and the gNBs 110 may communicate using a New Radio Positioning Protocol A (which may be referred to as NPPa or NRPPa). NRPPa may be defined in 3GPP Technical Specification (TS) 38.455, with NRPPa messages being transferred between the gNBs 110 and the LMF 152 via the AMF 154. As further illustrated in FIG. 2, LMF 152 and UE 105 may communicate using the LTE Positioning Protocol (LPP) defined in 3GPP TS 36.355, where LPP messages are transferred between the UE 105 and the LMF 152 via the AMF 154 and a serving gNB 110-1 for UE 105. For example, LPP messages may be transferred between the LMF 152 and the AMF 154 using service based operations and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, AOA, AOD, RSRP and/or RSRQ for gNBs 110, ng-eNBs 114 or WLAN APs, or measurements of GNSS pseudorange, code phase and/or carrier phase for SVs 190) and send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110, ng-eNBs 114 or other base stations or APs). With a network based position method, one or more base stations (e.g. gNBs 110 and/or ng-eNBs 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to a Location Retrieval Function (LRF) 157, which handles retrieval of location information for the UE 105 and may be used to provide location information for UE 105 to an external client 130 that is a Public Safety Answering Point, e.g. following an emergency call from UE 105 to the PSAP.

To support services including location services from external clients 130 for Internet of Things (IoT) UEs, a Network Exposure Function (NEF) 159 may be included. The NEF 159, for example, may function to obtain a current or last known location for a UE 105, may obtain an indication of a change in location for a UE 105, or an indication of when a UE 105 becomes available (or reachable). An external client 130 (e.g. an external Client 130 that is an Application Function) may access NEF 159 in order to obtain location information for UE 105. The NEF 159 may be connected to the GMLC 155 to support last known location, current location and/or deferred periodic and triggered location for the UE 105. If desired, the NEF 159 may include, or may be combined with, the GMLC 155, and may then obtain location information for UE 105 from LMF 152 via AMF 154.

Figure 3:
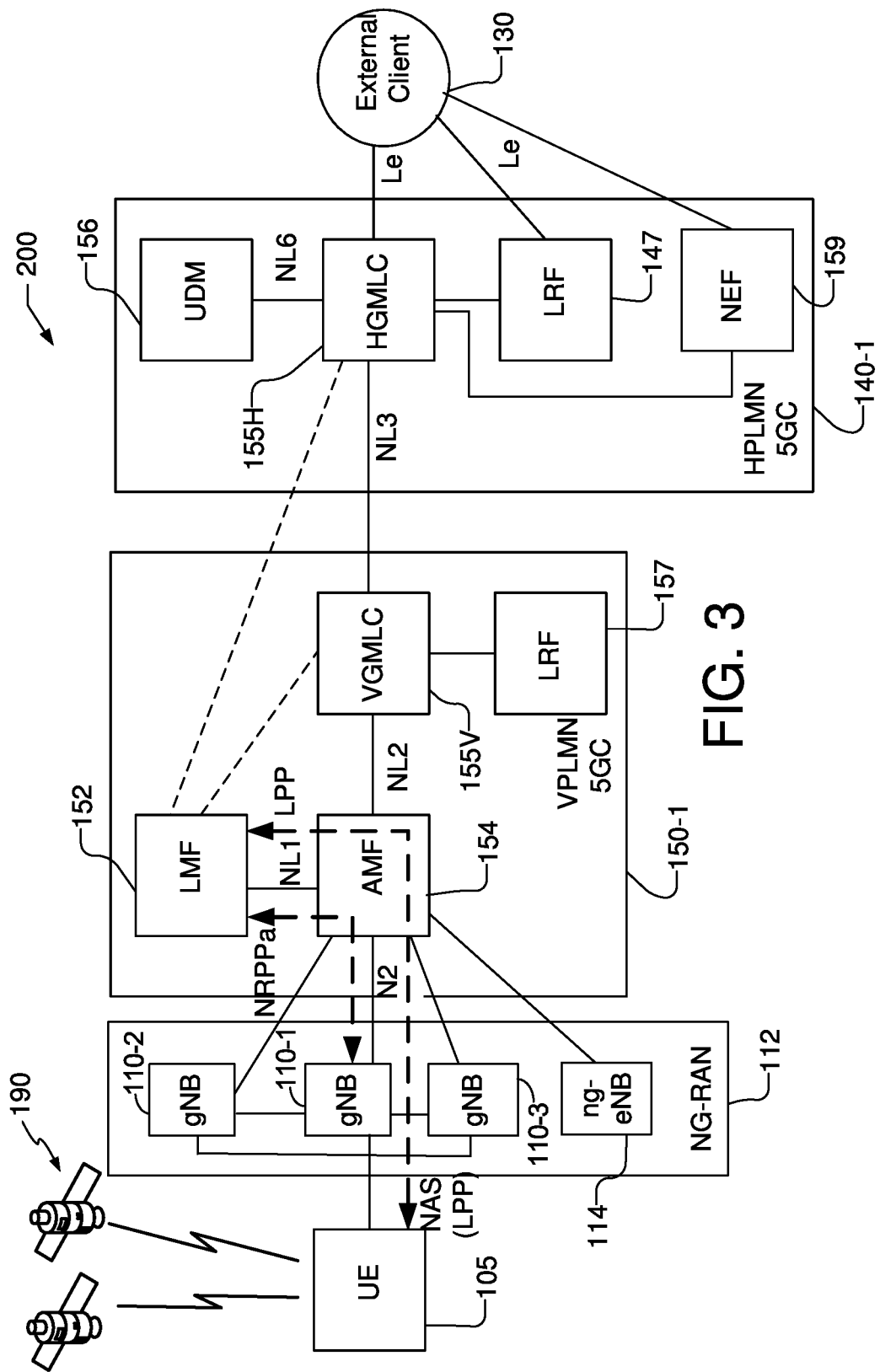
FIG. 3 is a block diagram illustrating a roaming reference architecture for UE location determination using time based and angle based muting of PRS transmitted by the base stations.

FIG. 3 illustrates a communication system 200 that is similar to the communication system 100 shown in FIG. 2, but supports location for a roaming UE 105. In the communication system 200, the core network 5GC 150-1 that is in communication with the UE 105 via the NG-RAN 112 is a visited network, i.e., Visited Public Land Mobile Network (VPLMN), which is in communication with a home network 5GC for UE 105, i.e., Home Public Land Mobile Network (HPLMN) 140-1. In communication system 200, the VPLMN 5GC 150-1 includes the Location Management Function (LMF) 152. The VPLMN 5GC 150-1 also includes a Visited Gateway Mobile Location Center (VGMLC) 155V, which is similar to the GMLC 155 in the non-roaming communication system of FIG. 2, and is designated as 155V to indicate that it is located in the visited network for UE 105. As illustrated in FIG. 3, the VGMLC 155V connects to the AMF 154 and to the LRF 157 in the VPLMN 5GC 150-1 and may connect to the LMF 152 (e.g. for periodic or triggered location of UE 105).

As illustrated, HPLMN 5GC 140-1 may include a Home GMLC (HGMLC) 155H that may be connected to the VGMLC 155V (e.g., via the Internet). Optionally (and as shown by the dashed line in FIG. 4), HGMLC 155H may be connected to LMF 152V (e.g. via the Internet) and may in that case not always be connected to VGMLC 155V. The HGMLC 155H may be similar to the GMLC 155 in the non-roaming communication system of FIG. 2, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 140-1. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 3) may be connected to HGMLC 155H (e.g., via the Internet) in order to provide location access to UE 105 on behalf of external clients connected to the RGMLC. The RGMLC, HGMLC 155H and VGMLC 155V may support location access to UE 105. HPLMN 5GC 140-1 also includes NEF 159 which may correspond to NEF 159 in communication system 100 and may be connected to HGMLC 155H.

As noted, while the communication systems 100 and 200 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GC 150 and/or 150-1 may be connected to a WLAN using a Non-3GPP InterWorking Function (N3IWF, not shown in FIGS. 2-3) in the 5GC 150. For example, the WLAN may support IEEE 802.11 WiFi access for UE 105. Here, the N3IWF may connect to the WLAN and to other elements in the 5GC 150 such as AMF 154.

In other embodiments, the 5GC cores 140-1 (referred to as 5GC 140) and 150 and 150-1 (collectively referred to as 5GC 150) may be configured to control different air interfaces, such as the Evolved Universal Terrestrial Radio Access Network (E-UTRAN) comprising one or more evolved NodeBs (eNBs) in place of the gNBs 110 and ng-eNB 114. In some other embodiments, both the NG-RAN 112 and the 5GC 140, 150 may be replaced by other RANs and other core networks. For example, in an Evolved Packet System (EPS) defined by 3GPP to support LTE access: the UE 105 may access the EPS rather than the NG-RAN 112 and 5GC 140/150; the NG-RAN 112 may be replaced by an E-UTRAN containing eNBs in place of the gNBs 110 an ng-eNB 114; and the 5GC 140/150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use an LTE Positioning Protocol A (LPPa) in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals.

Figure 4:
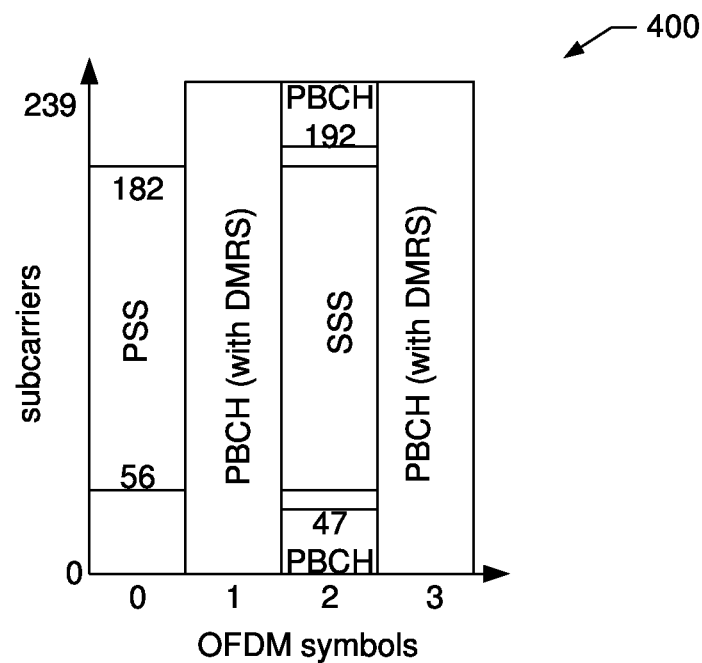
FIG. 4 illustrates an SSB transmitted by a gNB in a 5G wireless network.

In 5G NR, a gNB 110 may use periodic synchronization signal transmissions, referred to as Synchronization Signal Blocks (SSBs), which may be as defined in 3GPP TS 38.300 and 3GPP TS 38.211. FIG. 4 illustrates an SSB 400, which may be a group of 4 Orthogonal Frequency Division Multiplexing (OFDM) symbols in time and 240 subcarriers in frequency (i.e., 20 resource blocks). The SSB 400 carries the Primary Synchronization Signal (PSS), the Secondary Synchronization Signal (SSS) and the Physical Broadcast Channel (PBCH). A DeModulation Reference Signal (DMRS) associated with the PBCH can be used to estimate the Reference Signal Received Power (RSRP) of the SSB. In a slot of 14 symbols, there are two possible locations for SSBs: symbols 2-5 and symbols 8-11.

The SSBs may be grouped into Synchronization Signal (SS) bursts, e.g., in the first 5 milliseconds (ms), which can have different periodicities $T_{SS}$. The value of $T_{SS}$, for example, may be 5, 10, 20, 40, 80, or 160 ms. The maximum number L of SSBs in a burst is frequency-dependent. For example, above 6 GHz there may be up to 64 SSBs per burst. Each SSB may be transmitted in a certain angular direction from the gNB 110. A UE 105 may monitor the SSBs from every cell to be measured and decode the up to 8 bit SSB index, sometimes referred to as beam ID, using the Cell ID and other associated information embedded in the synchronization sequence.

Figure 5:
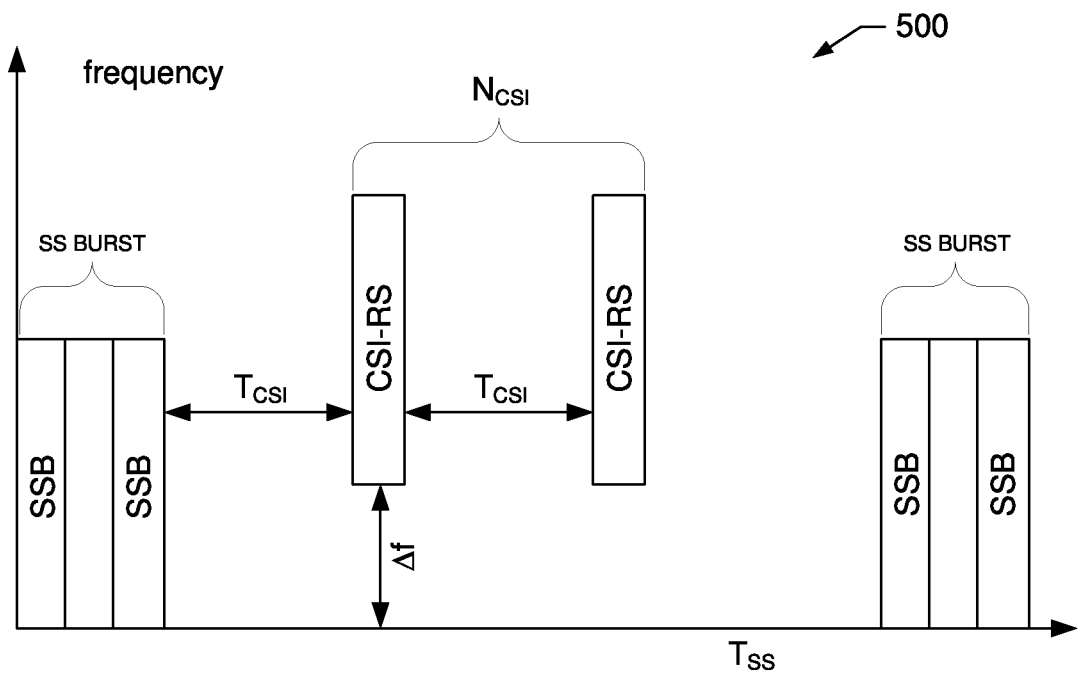
FIG. 5 illustrates a channel-state information reference signal (CSI-RS) measurement window transmitted by a gNB in a 5G wireless network.

FIG. 5 illustrates an example of a channel-state information reference signal (CSI-RS) measurement window 500 that may be used for Radio Resource Management (RRM) measurements for mobility management purposes in connected mode. As in LTE, it may be possible to configure multiple CSI-RS to the same SSB, in such a way that the UE 105 can first obtain synchronization with a given cell using the SSBs, and then use that as a reference to search for CSI-RS resources. Therefore, the CSI-RS measurement window configuration should contain at least the periodicity and time/frequency offsets relative to the associated SSB. As illustrated in FIG. 6, the transmission of the first CSI-RS is $T_{CSI}$ ms after the end of an SSB.

Because each SSB may be transmitted in a certain angular direction from the gNB 110, positioning signals (e.g. PRS) may be transmitted directionally, rather than covering the entire cell of the base station. Moreover, the direction of transmission of the positioning signal may change with time. For example, a directional beam may be rotated through 120 degrees for a cell sector or 360 degrees for an omnidirectional cell, with the rotation periodically repeated. Further, multiple directional beams may be transmitted at the same time in several different directions and the directions of transmission may change with time.

The directional beams from nearby cells may intersect and thus potentially interfere with each other at certain locations. Further, the locations of intersection (and thus the potential interference) may change with time as each intersecting directional beam changes transmission direction. To reduce interference between PRS transmitted by nearby base stations, a time based and angle (AOD) based muting pattern may be used. Thus, for each complete (e.g. 120 or 360 degree) PRS beam sweep, a set of "muting angles" may be used, which may change from one (e.g. 120 or 360 degree) sweep to the next. For example, when two beams from different base stations (gNB s 110) would normally intersect, one of the beams may be muted, with the muted beam changing from one sweep to the next.

Figure 6A:
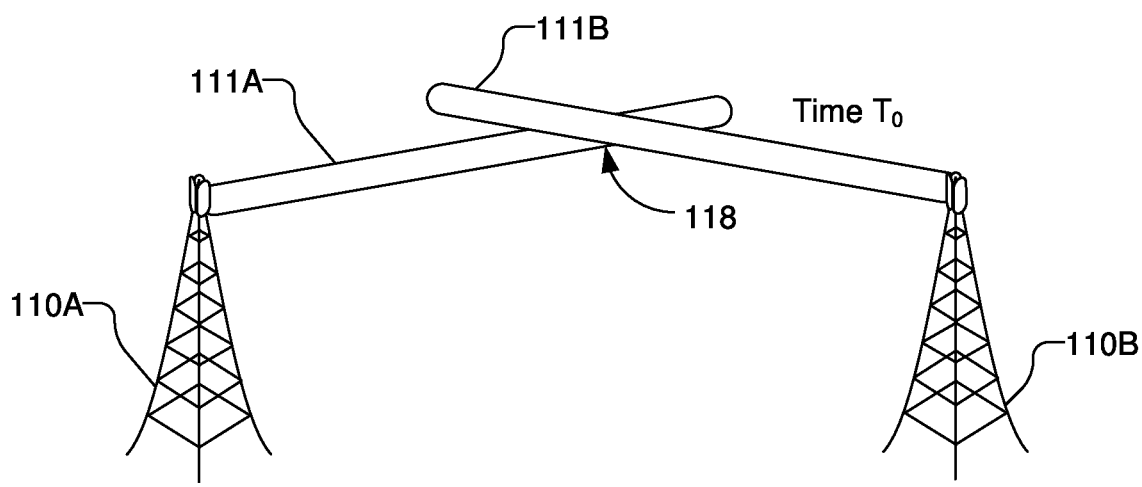
FIGS. 6A, 6B, and 6C illustrate two base stations producing directional beams and muting PRS at different times and angles.
Figure 6B:
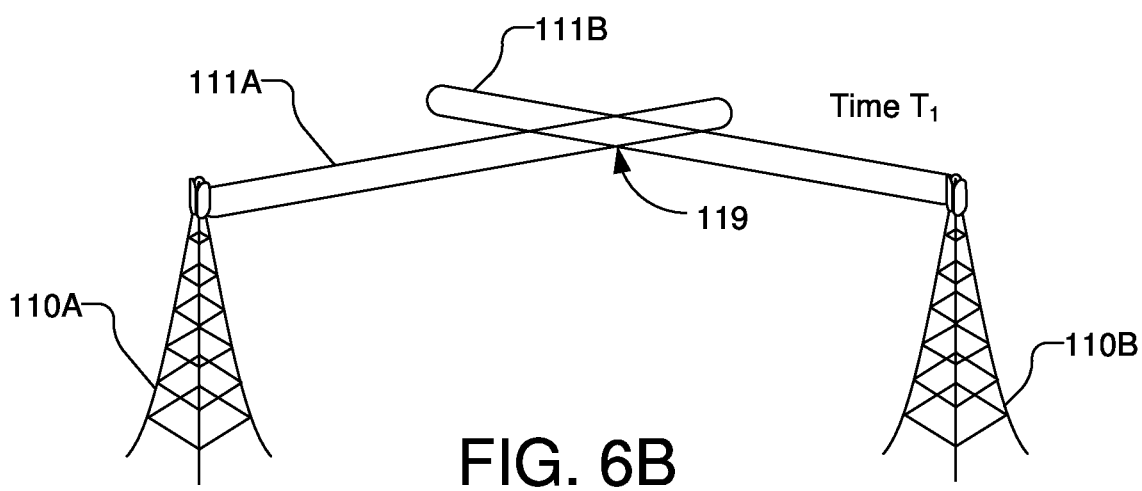
Figure 6C:
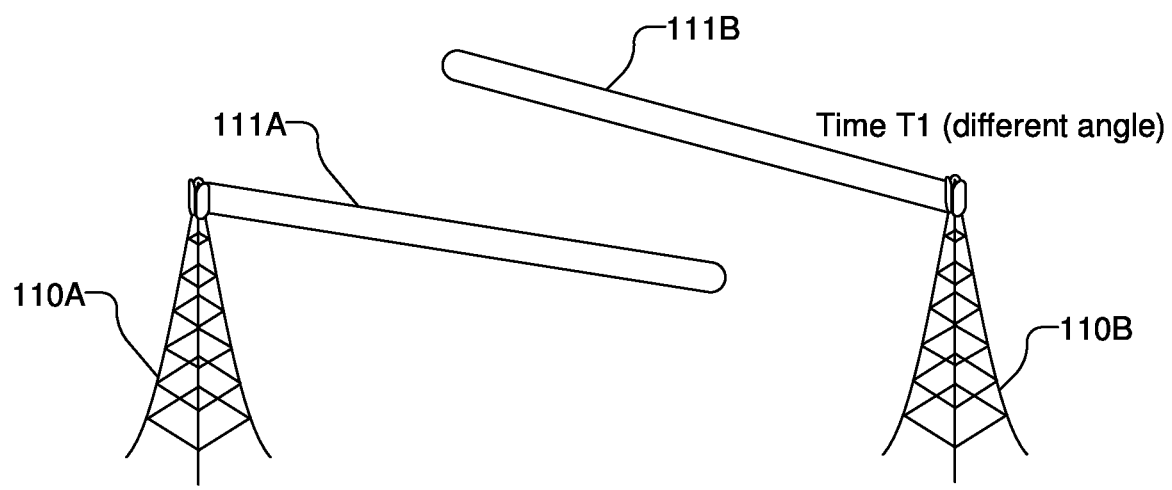

FIGS. 6A, 6B, and 6C, by way of example, illustrate two base stations 110A and 110B, producing directional beams 111A and 111B, respectively. Each of the directional beams 111A and 111B are rotated, e.g., through 120 or 360 degrees, for each beam sweep, which is periodically repeated. Each sweep may occur at a different time period, with the directional beams 111A and 111B rotating through multiple angles during that time period. For example, FIG. 6A illustrates directional beams 111A and 111B at a time $T_0$ and with particular angular positions such that the beams would normally intersect, thereby creating mutual interference. At the time and angle shown in FIG. 6A, base station 110A mutes the PRS in directional beam 111A, as illustrated by cross-hatching, while base station 110B does not mute the PRS in directional beam 111B, which avoids interference over the area or volume 118 at time $T_0$.

FIG. 6B illustrates directional beams 111A and 111B during the next sweep at time $T_1$ but with the same angular positions shown in FIG. 6A, such that the beams would normally intersect in a small area or volume 119, which may be the same as or similar to the area or volume 118. At the time and angle shown in FIG. 6B, base station 110B mutes the PRS in directional beam 111B, as illustrated by cross-hatching, while base station 110A does not mute the PRS in directional beam 111A, which avoids interference over the area or volume 119 at time $T_1$. This allows UE 105 to measure directional beam 111B at time $T_0$ and directional beam 111A at time $T_1$, with less interference (assuming UE 105 is located in areas or volumes 118 and 119 at these times).

FIG. 6C illustrates directional beams 111A and 111B during the same sweep as shown in FIG. 6B, e.g., at time $T_1$, but at different angular positions than shown in FIG. 6B, such that the beams do not intersect. As illustrated by the lack of cross-hatching in FIG. 6C, at the time and angle shown in FIG. 6C, neither base station 110A nor base station 110B mutes the PRS in directional beams 111A and 111B, respectively, since the beams do not intersect and thus cannot mutually interfere. Thus, in the first occasion when the directional beams intersect, the PRS from base station 110A is muted, while in the subsequent occasion when the directional beams intersect, the PRS from base station 110B is muted, and when at angles where the directional beams do not intersect, the PRS from neither base station 110A nor 110B is muted.

By way of example, one way to support a time based and angle based muting pattern, e.g., in assistance data sent to UE 105 by LMF 152 to assist OTDOA positioning, is to define a time based muting pattern and one or more angular based muting patterns. For example, a time based muting pattern may be provided for a particular beam (e.g. beam 111A or 111B in FIGS. 6A-6C) which comprises a time based sequence <A1, A2, A3, A4, . . . >, where A1 provides muting information for a first beam sweep, A2 for a second sweep etc. (e.g. with wraparound of the muting pattern at the end of the sequence). The muting information for each element A1 may comprise an angular based muting sequence <a1, a2, a3, . . . >, where each ai indicates an angular range that may or may not be muted according to whether there is a binary 1 (not muted) or a binary 0 (muted) at the corresponding position in the angular based sequence. For example, element a1 might correspond to a range of 0 to 5 degrees, element a2 might correspond to range of 5 to 10 degrees, element a3 to a range of 10 to 15 degrees etc., where angles may be horizontal (and/or vertical) angles in a clockwise (or anticlockwise) direction relative to the start of a beam sweep (e.g. in some known direction such as due East or due West). In a simplest case, there may be only one fixed angular based muting sequence <a1, a2, a3, . . . > that is applied to each beam sweep (each element Ai) in the time based sequence. In this case, the time based sequence can be represented by a binary muting pattern (e.g. <10001000>) where a binary 1 indicates use of the fixed angular based muting sequence for the beam sweep and a binary 0 indicates no muting of the beam sweep. For example, if the fixed angular based muting sequence, labelled here as A, is <10101010> for a sequence of 8 angular ranges 0-5, 5-10, 10-15, 15-20, 20-25, 25-30, 30-35 and 35-40 degrees, and if the time based muting pattern, labelled here as T, is <10001000>, then at the first time, an initial "1" in the T sequence indicates no muting for any of the angular ranges (i.e. the beam is transmitted over all the directions without muting). Then at the second time in the T sequence, the second "0" bit in the sequence indicates use of the angular based muting sequence A which mutes the angular ranges alternately—with 5-10, 15-20, 25-30 and 35-40 degrees being muted and the other ranges not being muted.

Depending on the network deployment, a certain beam of one base station, may interfere with only a few other beams of other base stations. Accordingly, the PRS may be muted in a limited number of beams in a base station with respect to beams from other base stations, but the remaining beams (or angles) of the base station need not be muted.

For example, in beam sweeping deployments the same as or similar to that for FIGS. 6A-6C, the network may identify when interfering beams intersect, and at that time and angle, the PRS from all intersecting beams except one may be muted. The beam to be muted may be circularly changed for every sweeping and intersection instance.

In a static beam deployment, a base station, e.g., gNB 110, may transmit multiple directional beams at the same time in several different directions and change the directions of transmission with time. In the static beam deployment, the network may identify a set of "Muting Angles," which means for a certain beam B of a certain cell, which beams from other neighboring cells needs to be muted to avoid interfering with the beam B.

In one implementation, a 2D muting pattern may be defined across time and angle (AOD). The angular information may be captured through beam/SSB ID or AOD or any alternate method.

Figures 7, 8:
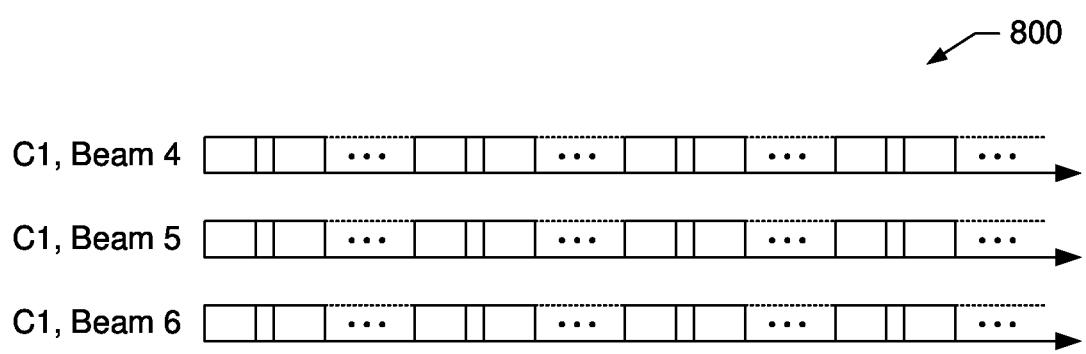
FIG. 7 illustrates a two-dimensional muting pattern for a base station that is defined across time and beam ID or angle (AOD).
FIG. 8 illustrates a portion of PRS muting information for beams transmitted at different angles (AOD) from a single base station.

FIG. 7, by way of example, shows a two dimensional (2D) muting pattern 700, for a base station, where successive PRS transmission times (or successive PRS positioning occasions) are labelled P0, P1 . . . P7, and where successive beam angular ranges (or successive angles of departure (AOD)) are labelled B0, B1, . . . B7. The table in FIG. 7 shows some example muting assignments for different combinations of PRS transmission time and beam angular range. For example, a binary "0" entry for the combination {B2, P6} would mean that for the 6th PRS occasion for that cell along beam B2 (or angular range B2), PRS would be muted. Similarly, a binary "1" entry for the combination {B2, P3} would mean that for the 3$^{rd}$ PRS occasion for that cell and along beam B2 (or angular range B2), PRS would be transmitted and not be muted. Similar binary "0" or "1" entries could be assigned to all other combinations of PRS occasion and beam or angular range in the table in FIG. 7 to completely define whether PRS transmission occurs or is muted for all combinations.

In a static beam deployment implementation, e.g., where a base station transmits multiple directional beams at the same time in several different directions and changes the directions of transmission with time, PRS may be independently scheduled on each directional beam, e.g., SSB ID. In such cases, the PRS on multiple beams can be scheduled on the same radio band. Accordingly, the PRS on one beam may interfere with the PRS on another beam transmitted by the same base station on the same frequency layer.

In order to maintain good PRS detectability, a time based and angle based muting pattern may be used to mute one beam transmitted by the base station with respect to another beam transmitted by the same base station. The time based and angle based PRS muting pattern for a base station, for example, may be implemented by providing a time based muting pattern for each separate beam transmitted by the base station. This PRS muting information may be provided for every {Cell, Beam ID} pair in the assistance data.

FIG. 8, by way of example, illustrates a portion of PRS muting information 800 for a single base station (e.g. a gNB 110), which supports a cell 'C1' that has 16 supported beams {B1, B2 . . . , B16} each having a different directional angle (or a different AOD), and where the directional angle (or AOD) successively increases (or successively decreases) along the sequence B1, B2, . . . B16. In this example, adjacent beams (e.g. B5 and B6) would typically mutually interfere due to some overlap of their directional angles (or AODs). To avoid such mutual interference, the PRS muting of the beams can be defined with respect to adjacent beams by muting one beam in a pair of adjacent beams at each transmission time. This is illustrated in FIG. 8 by the cross-hatched rectangles which represent PRS transmission that is muted for a beam and the corresponding clear rectangles for other beams which represent unmuted PRS transmission at the same times. In this example, FIG. 8 shows that beam B5 is muted with respect to adjacent beams B4 and B6. As illustrated by the cross-hatching, beam 5 has a PRS muting pattern of 0101, while Beam 4 and Beam 6 have muting patterns of 1010. Thus, non-interfering beams (in this example beams 4 and 6) with sufficiently different AOD may have PRS occasions that overlap in time are not muted with respect to one another, while interfering beams (in this example beams 4 and 5 and beams 5 and 6) are muted with respect to one another to avoid mutual interference.

Figure 9:
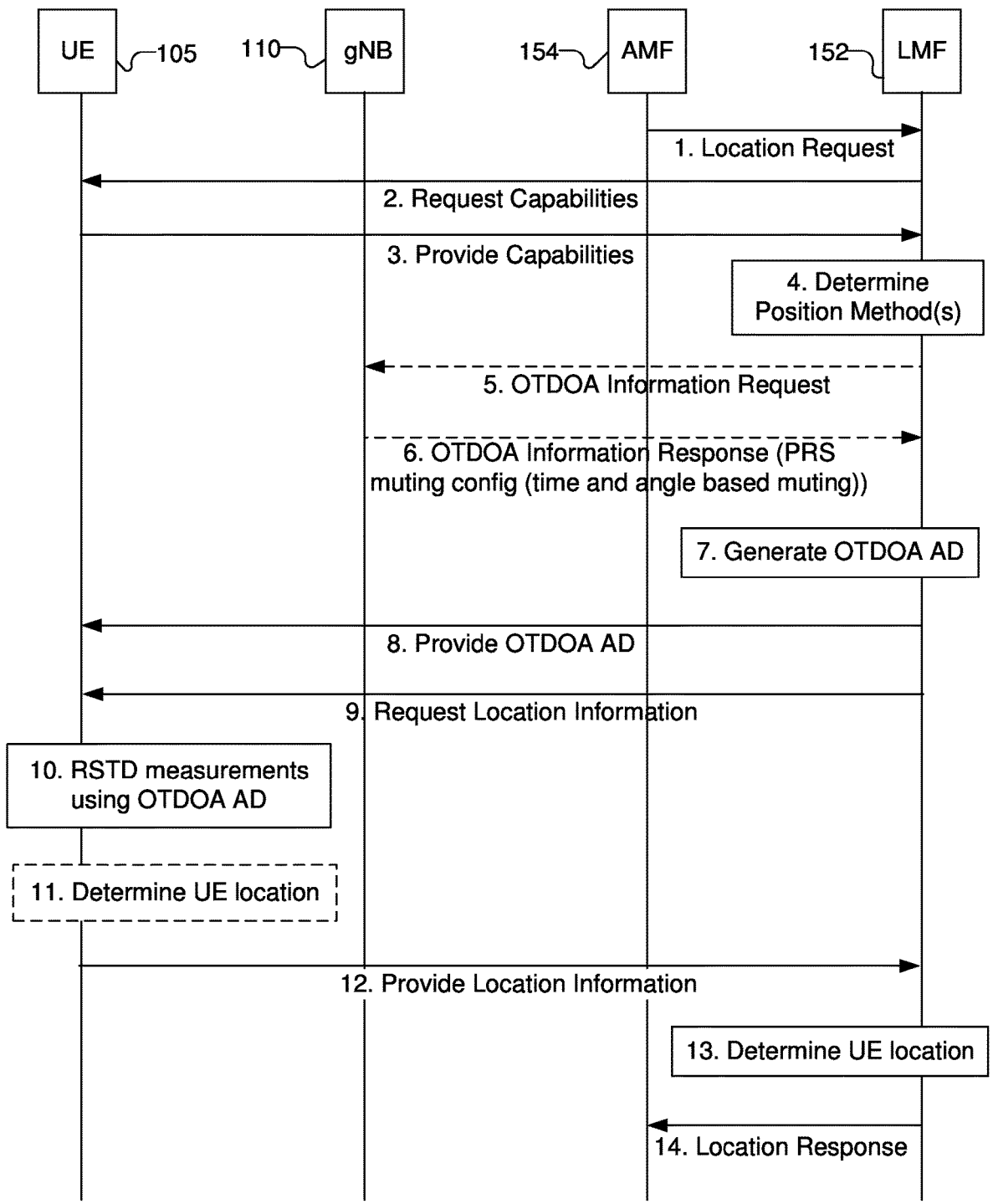
FIG. 9 shows a procedure which may be used to support position methods (e.g. OTDOA) in which PRS time based and angle based muting is used.

FIG. 9 shows a procedure which may be used to support position methods (e.g. OTDOA) in which PRS time based and angle based muting are used.

At stage 1 in FIG. 9, LMF 152 receives a location request for UE 105 from AMF 154. For example, in communication system 100, client 130 may send a location request for UE 105 to GMLC 155 which forwards the request to AMF 154 (not shown in FIG. 9), which in turn sends the request to LMF 152 at stage 1.

At stage 2 in FIG. 9, LMF 152 sends an LPP Request Capabilities message to UE 105 via the serving AMF 154 and serving gNB 110 to request the positioning capabilities of UE 105. The Request Capabilities message may indicate the type of capabilities needed. For example, for OTDOA, the UE's OTDOA capabilities are requested.

At stage 3, the UE 105 returns an LPP Provide Capabilities message to LMF 152 comprising the positioning capabilities of UE 105. UE 105 may include its capability to support OTODA and may include the ability to support PRS time based and angle based muting.

At stage 4, LMF 152 determines one or more position methods with which to obtain a location estimate for UE 105. The position methods may be determined based on the positioning capabilities of UE 105 received at stage 3 and the capabilities of LMF 152. In this example, the positioning methods determined at stage 4 include or comprise OTDOA.

At stage 5, the LMF 152 sends an OTDOA Information Request to the gNB 110. For example, the OTDOA Information Request may request that the gNB 110 provide information related to OTDOA include the PRS muting configuration for one or more cells for gNB 110.

At stage 6, the gNB 110 may return an OTDOA Information Response to the LMF 152 providing the requested information, including the PRS muting configuration for one or more cells for gNB 110, which includes information related to time and angle based PRS muting. For example, the information may be provided in the form of a table such as that illustrated in FIG. 7 and/or may be provided as described for FIGS. 6A-6C. The OTDOA Information Request of stage 5 and the OTDOA Information Response of stage 6 may be, e.g., Long Term Evolution (LTE) Positioning Protocol A (LPPa) or New Radio Position Protocol A (NRPPa) messages.

At stage 7, the LMF 152 may generate OTDOA assistance data (AD), e.g., using information received in the OTDOA Information Response from the gNB 110 at stage 6 or OTDOA information obtained elsewhere for gNB 110 and/or other gNB s 110. The OTDOA assistance data may include assistance data for the gNB 110 and other gNBs that may be nearby. For example, the OTDOA AD may include PRS configuration information for one more cells supported by gNB 110 and possibly other gNBs 110. The PRS configuration information may include information related to time and angle based PRS muting (e.g. as described previously in association with FIGS. 6A-8).

At stage 8, the LMF 152 provides the OTDOA AD to the UE 105—e.g. by sending the OTDOA AD as part of an LPP Provide Assistance Data message to UE 105.

At stage 9, the LMF 152 sends an LPP Request Location Information message to the UE 105 to request RSTD measurements for OTDOA positioning. The message may include, e.g., the type of location measurements, the desired accuracy, response time, etc.

At stage 10, the UE 105 performs the requested measurements using the OTDOA AD from stage 8. For example, location measurements may be one or more of a Reference Signal Time Difference (RSTD), a Receive-Transmit (Rx-Tx) time difference, an Angle of Arrival (AOA), a Round Trip signal propagation Time (RTT), an Angle of Departure (AOD), a Reference Signal Strength Indication (RSSI), a Reference Signal Received Power (RSRP), a Reference Signal Received Quality (RSRQ). To perform the requested measurements at stage 10, the UE 105 may make use of PRS configuration information received at stage 8, which may include information related to time and angle based PRS muting. For example, by knowing the time and angle based muting sequence for different PRS beams transmitted by gNB 110 and by other gNB s 110, UE 105 may determine which PRS beam or beams are being transmitted during any PRS positioning occasion and thus which PRS beams the UE 105 may be able to acquire and measure at any time, and may then attempt to measure one or more of these PRS beams—e.g. to obtain or help obtain RSTD, Rx-Tx, AOD, RSRP measurements etc.

At stage 11, which is optional, UE 105 may determine a location estimate for UE 105 using the measurements obtained at stage 10. Stage 11 may be performed when the OTDOA AD received by UE 105 at stage 8 includes location coordinates for gNB 110 and other gNBs 110 and information related to PRS transmission timing (e.g. such as real time differences between pairs of gNBs 110 and/or a level of synchronization of transmission timing for different gNBs 110).

At stage 12, the UE 105 provides location information, e.g., the RSTD measurements and any other measurements obtained at stage 10 or the location estimate obtained at stage 11 when stage 11 occurs, to the LMF 152.

At stage 13, the LMF 152 may determine (or verify) the UE location using the received location information.

At stage 14, LMF 152 returns the UE location to AMF 154 which may in turn return the location to external client 130 via GMLC 155 (not shown in FIG. 9).

Figure 10:
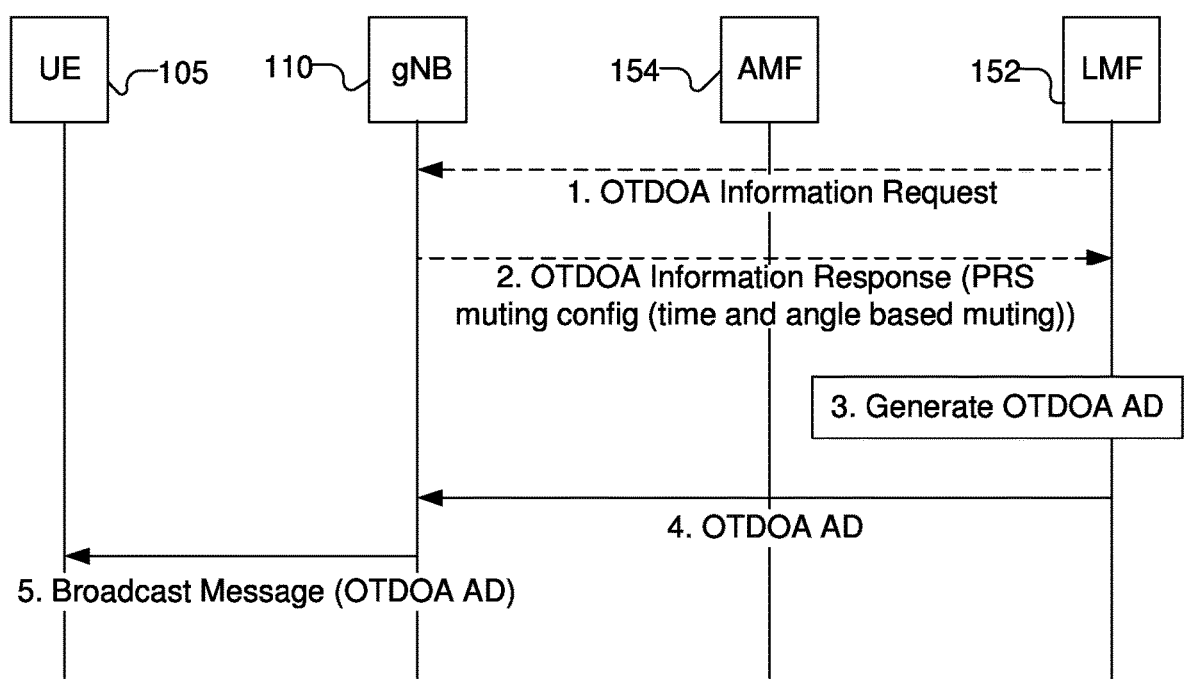
FIG. 10 shows a procedure which may be used to broadcast assistance data containing PRS configuration information to a UE.

FIG. 10 shows a procedure which may be used to support position methods (e.g. OTDOA) in which assistance data (AD) for PRS time based and angle based muting is used and is provided to a UE 105 via broadcast.

At stage 1 and stage 2 in FIG. 10, which are optional stages, LMF 152 may request and obtain information from gNB 110 related to OTDOA including the PRS muting configuration for each of one or more cells for gNB 110. The PRS muting configuration for each of the one or more cells for gNB 110 may include information related to time and angle based PRS muting. Stages 1 and 2 in FIG. 10 may correspond to stages 5 and 6 in FIG. 9. LMF 152 may repeat stages 1 and 2 in FIG. 10 for other gNBs 110 to obtain a PRS muting configuration for each of one or more cells for each of the other gNBs 110. Each PRS muting configuration for each of the one or more cells for each of the other gNB s 110 may include information related to time and angle based PRS muting.

At stage 3 in FIG. 10, LMF 152 determines assistance data to be broadcast in each of one or more cells for gNB 110 and possibly AD to be broadcast in each of one or more cells for each of the other gNBs 110. The AD may be based on (e.g. may include) the PRS muting configuration for each of the one or more cells for gNB 110 (and each of the one or more cells for each of the other gNBs 110) (e.g. including information related to time and angle based PRS muting) that were received at stage 2.

At stage 4 in FIG. 10, LMF 152 sends the assistance data determined at stage 3 for each of the one or more cells for gNB 110 to gNB 110 via AMF 154. LMF 152 may also send assistance data determined at stage 3 for each of the one or more cells for each of the other gNBs 110 to each gNB 110 (e.g. via AMF 154 or via another AMF).

At stage 5, gNB 110 broadcasts the assistance data received from LMF 152 for each of the one or more cells for gNB 110 in the each cell. The broadcast may be periodic and/or may occur when a request for assistance data is received by gNB 110 from UE 105.

When the procedure in FIG. 10 occurs, location of UE 105 by LMF 152 can occur as described for FIG. 9 but with certain changes. Specifically, one or more of stages 5-8 in FIG. 9 may no longer occur and instead, UE 105 may obtain assistance data to enable the measurements at stage 10 in FIG. 9, and optionally location of UE 105 at stage 11 in FIG. 9 when stage 11 occurs, by receiving the assistance data in broadcast messages from gNB 110 which are sent as described for stage 5 of FIG. 10.

Figure 11:
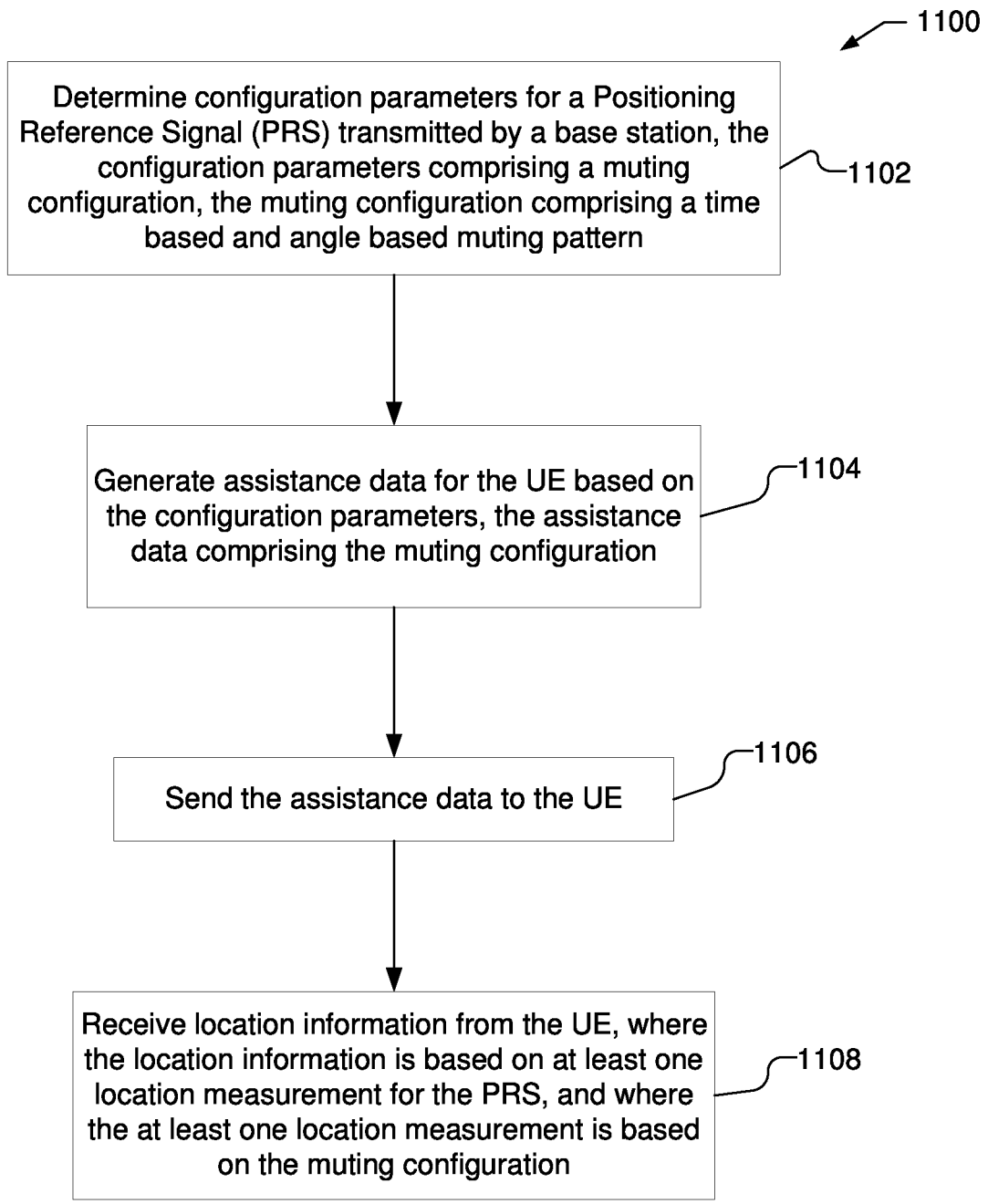
FIG. 11 shows a process flow illustrating a method for supporting location services for a user equipment performed by a location server, in which PRS time based and angle based muting is used.

FIG. 11 shows a process flow 1100 illustrating a method for supporting location services for a user equipment (UE) such as the UE 105. Process flow 1100 may be performed by a location server, such an LMF (e.g. LMF 152) that supports the PRS time based and angle base muting discussed above. Process flow 1100 may start at block 1102, where the location server determines configuration parameters for a Positioning Reference Signal (PRS) transmitted by a base station, the configuration parameters comprising a muting configuration, the muting configuration comprising a time based and angle based muting pattern, e.g., as at stage 7 of FIG. 9. The location server may determine the configuration parameters for the PRS by sending an information request to the base station and receiving an information response from the base station, the information response including the configuration parameters for the PRS, e.g. as at stages 5 and 6 in FIG. 9. The information request and the information response may be Long Term Evolution (LTE) Positioning Protocol A (LPPa) or New Radio Position Protocol A (NRPPa) messages for Observed Time Difference of Arrival (OTDOA) information and OTDOA information response, respectively. At block 1104, the location server may generate assistance data for the UE based on the configuration parameters, the assistance data comprising the muting configuration, as illustrated at stage 7 of FIG. 9. At block 1106, the location server may send the assistance data to the UE, as illustrated at stage 8 of FIG. 9, or as illustrated at stages 4 and 5 of FIG. 10. At block 1108, the location server may receive location information from the UE, where the location information is based on at least one location measurement for the PRS, and where the at least one location measurement is based on the muting configuration, as illustrated at stage 12 of FIG. 9. The at least one location measurement, for example, may comprise one or more of a Reference Signal Time Difference (RSTD), a Receive- Transmit (Rx-Tx) time difference, an Angle of Arrival (AOA), an Angle of Departure (AOD), a Reference Signal Received Power (RSRP), and a Reference Signal Received Quality (RSRQ).

In some implementations, the location server may send the assistance data to the UE by sending the assistance data as part of a message, e.g., an LPP Provide Assistance Data message to the UE, as illustrated at stage 8 of FIG. 9. In some implementations, the location server may send the assistance data to the UE by sending the assistance data to the base station, and the base station broadcasts the assistance data to the UE, e.g., as illustrated at stages 4 and 5 of FIG. 10.

In some implementations, the location server may determine a location for the UE based at least in part on the location information, as illustrated at stage 13 of FIG. 9. In some implementations, the location information may comprise the at least one location measurement or may comprise the location (e.g. if the UE determines the location as at stage 11 in FIG. 9).

The base station may be, e.g., a New Radio (NR) NodeB (e.g. a gNB 110) or a Next Generation evolved NodeB (e.g. ng-eNB 114) in a Fifth Generation (5G) wireless network. The PRS may be transmitted by the base station in a plurality of different directions and at a plurality of different times. For example, the PRS may be transmitted in different directions in the plurality of different directions at the same times in the plurality of different times, e.g., in a static beam deployment implementation. The PRS may be transmitted in different directions in the plurality of different directions at different times in the plurality of different times, e.g., in a beam sweeping deployment implementation. The time based and angle based muting pattern may comprise an indication, for each direction in the plurality of different directions and for each time in the plurality of different times, as to whether the PRS is transmitted or muted by the base station.

In some implementations, the time based and angle based muting pattern may comprise a time based muting pattern comprising a plurality of beam sweeps wherein each beam sweep has an angular based muting pattern indicating an angular range at which the PRS signal is muted, and wherein the plurality of beam sweeps use one or more angular based muting patterns. The time based muting pattern and one or more angular based muting patterns may be configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep (e.g. as described above for FIGS. 6A-6C).

In some implementations, the base station transmits multiple beams simultaneously, each beam being transmitted in a different angular range, wherein the time based and angle based muting pattern comprises independently scheduled time based muting patterns for beams being transmitted in the different angular range. The independently scheduled time based muting patterns for the beams being transmitted in the different angular range may be configured to reduce interference between the PRS signals from separate beams being transmitted simultaneously by the base station. The independently scheduled time based muting pattern for each beam may be configured to reduce any interference from PRS signals from beams transmitted by other base stations.

In some implementations, the time based and angle based muting pattern is defined by a two-dimensional muting pattern across time and angular direction (e.g. as described for FIG. 7).

Figure 12:
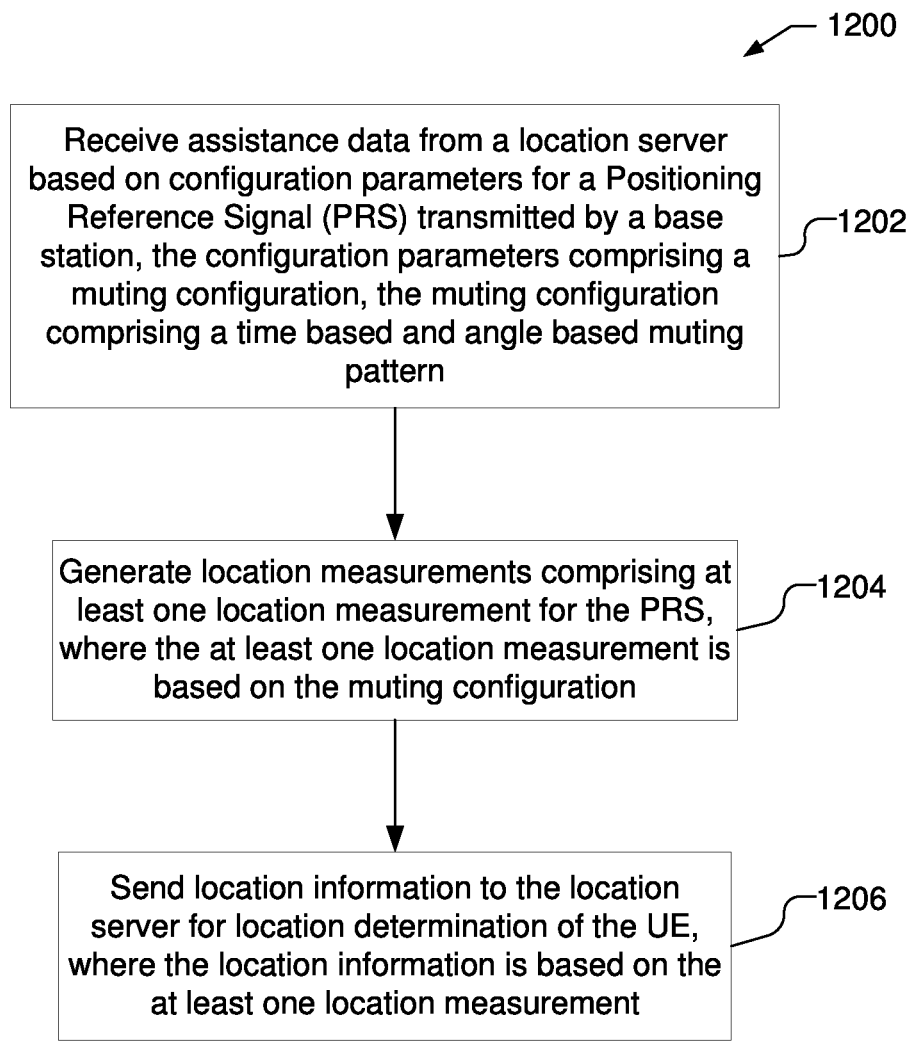
FIG. 12 shows a process flow illustrating a method for supporting location services for a user equipment performed by the user equipment, in which PRS time based and angle based muting is used.

FIG. 12 shows a process flow 1200 illustrating a method for supporting location services for a user equipment (UE), which may be performed by the UE, such as UE 105, that supports the PRS time based and angle base muting discussed above. Process flow 1200 may start at block 1202, where the UE receives assistance data from a location server based on configuration parameters for a Positioning Reference Signal (PRS) transmitted by a base station, where the configuration parameters comprise a muting configuration, and where the muting configuration comprises a time based and angle based muting pattern. The base station may be a New Radio (NR) NodeB (e.g. gNB 110) or a Next Generation evolved NodeB (e.g. ng-eNB 114) in a Fifth Generation (5G) wireless network and the location server may be a Location Management Function (e.g. LMF 152). Block 1202 may correspond to stage 8 in FIG. 9 or stages 4 and 5 of FIG. 10.

At block 1204, the UE generates (e.g. obtains) location measurements comprising at least one location measurement for the PRS, where the at least one location measurement is based on the muting configuration. Block 1204 may correspond to stage 10 in FIG. 9.

At block 1206, the UE sends location information to the location server for location determination of the UE, where the location information is based on the at least one location measurement. Block 1206 may correspond to stage 12 in FIG. 9.

In some implementations, the UE may receive the assistance data from the location server as part of a message, e.g., an LPP Provide Assistance Data message from the location server, as illustrated at stage 8 of FIG. 9. In some implementations, the UE may receive the assistance data as a broadcast from the base station, where the base station receives the assistance data from the location server, e.g., as illustrated at stages 4 and 5 of FIG. 10.

In some implementations, the UE may further determine a location for the UE based at least in part on the at least one location measurement, where the location information comprises the location (e.g. as at stage 11 in FIG. 9). In some other implementations, the location information may comprise the at least one location measurement.

The PRS may be transmitted by the base station in a plurality of different directions and at a plurality of different times. For example, the PRS may be transmitted in different directions in the plurality of different directions at the same times in the plurality of different times, e.g., in a static beam deployment implementation. The PRS may be transmitted in different directions in the plurality of different directions at different times in the plurality of different times, e.g., in a beam sweeping deployment implementation. The time based and angle based muting pattern may comprise an indication, for each direction in the plurality of different directions and for each time in the plurality of different times, as to whether the PRS is transmitted or muted by the base station.

In some implementations, the UE may generate the location measurements comprising the at least one location measurement for the PRS by determining an angular position with respect to the base station and using the angular position along with the angle based muting pattern for the base station to generate the at least one location measurement. In other implementations, the at least one location measurement for the PRS may be determined without knowledge of an angular position with respect to the base station.

In some implementations, the time based and angle based muting pattern may comprise a time based muting pattern comprising a plurality of beam sweeps, wherein each beam sweep has an angular based muting pattern indicating an angular range at which the PRS signal is muted, and wherein the plurality of beam sweeps use one or more angular based muting patterns. The time based muting pattern and one or more angular based muting patterns may be configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep (e.g. as described for FIGS. 6A-6C).

In some implementations, the base station transmits multiple beams simultaneously, each beam being transmitted in a different angular range, wherein the time based and angle based muting pattern comprises independently scheduled time based muting patterns for beams being transmitted in the different angular range. The independently scheduled time based muting patterns for the beams being transmitted in the different angular range may be configured to reduce interference between the PRS signals from separate beams being transmitted simultaneously by the base station. The independently scheduled time based muting pattern for each beam may be configured to reduce any interference from PRS signals from beams transmitted by other base stations.

In some implementations, the time based and angle based muting pattern may be defined by a two-dimensional muting pattern across time and angular direction, e.g. as described for FIG. 7.

Figure 13:
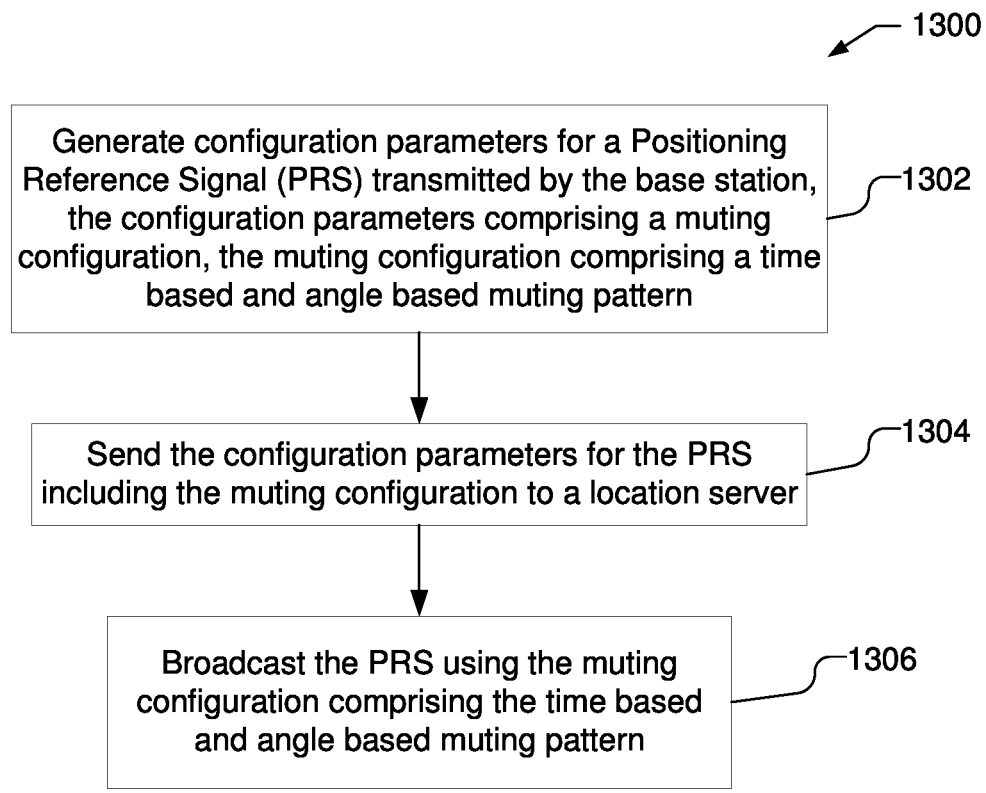
FIG. 13 shows a process flow illustrating a method for supporting location services for a user equipment performed by a base station, in which PRS time based and angle based muting is used.

FIG. 13 shows a process flow 1300 illustrating a method for supporting location services for a user equipment (e.g. UE 105), which may be performed by a base station, such as a gNB 110 or ng-eNB 114, that supports the PRS time based and angle base muting discussed above. Process flow 1300 may start at block 1302, where configuration parameters are generated for a Positioning Reference Signal (PRS) transmitted by the base station, where the configuration parameters comprise a muting configuration, and where the muting configuration comprises a time based and angle based muting pattern.

At block 1304, the configuration parameters for the PRS including the muting configuration are sent to a location server. Blocks 1302 and 1304 may correspond to stage 6 in FIG. 9, in one example.

At block 1306, the base station broadcasts the PRS using the muting configuration comprising the time based and angle based muting pattern.

In some implementations, the base station is a New Radio (NR) NodeB (e.g. gNB 110) or a Next Generation evolved NodeB (e.g. ng-eNB 114) in a Fifth Generation (5G) wireless network and the location server is a Location Management Function (e.g. LMF 152). The PRS may be transmitted by the base station in a plurality of different directions and at a plurality of different times. For example, the PRS may be transmitted in different directions in the plurality of different directions at the same times in the plurality of different times, e.g., in a static beam deployment implementation. The PRS may be transmitted in different directions in the plurality of different directions at different times in the plurality of different times, e.g., in a beam sweeping deployment implementation. The time based and angle based muting pattern may comprise an indication, for each direction in the plurality of different directions and for each time in the plurality of different times, as to whether the PRS is transmitted or muted by the base station.

In some implementations, the base station may receive an information request from the location server and may send an information response to the location server, the information response including the configuration parameters for the PRS (e.g. as stage 5 and stage 6 in FIG. 9). The information request and the information response may be Long Term Evolution (LTE) Positioning Protocol A (LPPa) or New Radio Position Protocol A (NRPPa) messages for Observed Time Difference of Arrival (OTDOA) information and OTDOA information response.

In some implementations, the time based and angle based muting pattern may comprise a time based muting pattern comprising a plurality of beam sweeps wherein each beam sweep has an angular based muting pattern indicating an angular range at which the PRS signal is muted, and wherein the plurality of beam sweeps use one or more angular based muting patterns. The time based muting pattern and one or more angular based muting patterns may be configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep.

In some implementations, the base station transmits multiple beams simultaneously, each beam being transmitted in a different angular range, wherein the time based and angle based muting pattern comprises independently scheduled time based muting patterns for beams being transmitted in the different angular range. The independently scheduled time based muting patterns for the beams being transmitted in the different angular range may be configured to reduce interference between the PRS signals from separate beams being transmitted simultaneously by the base station. The independently scheduled time based muting pattern for each beam may be configured to reduce any interference from PRS signals from beams transmitted by other base stations.

In some implementations, the time based and angle based muting pattern is defined by a two-dimensional muting pattern across time and angular direction, e.g. as described for FIG. 7.

Figure 14:
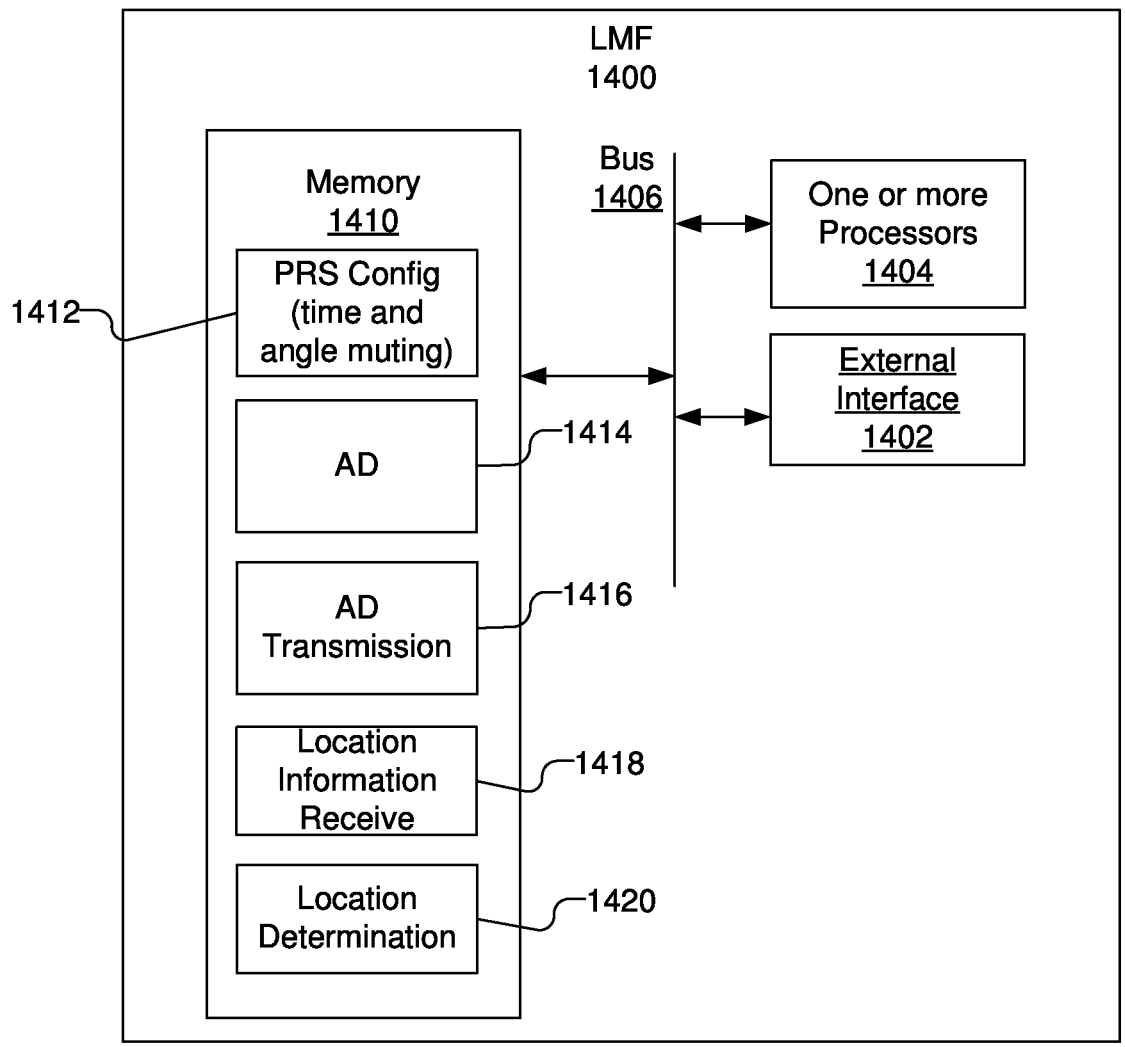
FIG. 14 is a block diagram of an embodiment of an LMF capable of supporting location services for a UE.

FIG. 14 is a diagram illustrating an example of a hardware implementation of an LMF 1400, such as LMF 152 shown in FIGS. 2-3 and 9-10. The LMF 1400 may be, e.g., part of a wireless network such as a 5G Core network (e.g. 5GC 150 or 150-1). The LMF 1400 includes, e.g., hardware components such as an external interface 1402, which may be a wired or wireless interface capable of connecting to a GMLC, such as GMLC 155, VGMLC 155V or HGMLC 155H, and AMF 154. The LMF 1400 includes a one or more processors 1404 and memory 1410, which may be coupled together with bus 1406. The memory 1410 may contain executable code or firmware or software instructions that when executed by the one or more processors 1404 cause the one or more processors 1404 to operate as a special purpose computer programmed to perform the procedures and techniques disclosed herein.

As illustrated in FIG. 14, the memory 1410 includes one or more components or modules that when implemented by the one or more processors 1404 implements the methodologies described herein. While the components or modules are illustrated as software in memory 1410 that is executable by the one or more processors 1404, it should be understood that the components or modules may be dedicated hardware either in the processors 1404 or off processor. As illustrated, the memory 1410 may include a PRS configuration unit 1412 that causes the one or more processors 1404 to determine the configuration parameters for PRS signals transmitted by base stations, where the configuration parameters include a muting configuration, the muting configuration comprising a time based and angle based muting pattern. For example, the PRS configuration unit 1412 may cause the external interface 1402 to send an information request to the base station and receive an information response from the base station that includes the configuration parameters for the PRS, or to obtain the PRS configuration parameters from other sources. An assistance data (AD) unit 1414 causes the one or more processors 1404 to generate assistance data for a UE (e.g. UE 105) based on the configuration parameters, the assistance data comprising the muting configuration. An assistance data transmission unit 1416 causes the one or more processors 1404 to send the assistance data to the UE via the external interface 1402. The assistance data may be sent as part of a message, e.g., an LPP Provide Assistance Data message to the UE, or may be sent to a base station, which broadcasts the assistance data. A location information receive unit 1418 configures the one or more processors 1404 to receive location information from the UE via the external interface 1402, where the location information is based on at least one location measurement for the PRS, and where the at least one location measurement is based on the muting configuration. A location determination unit 1420 configures the one or more processors 1404 to determine a location for the UE based at least in part on the location information received by the location information receive unit 1418. The location information may comprise the at least one location measurement or may comprise the location.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1410) and executed by one or more processor units (e.g. processors 1404), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1410, and are configured to cause the one or more processors (e.g. processors 1404) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server, such as LMF 1400, capable of supporting location services for a UE, such as UE 105, may include a means for determining configuration parameters for a Positioning Reference Signal (PRS) transmitted by a base station, the configuration parameters comprising a muting configuration, the muting configuration comprising a time based and angle based muting pattern, which may be, e.g., the one or more processors 1404 with dedicated hardware or implementing executable code or software instructions in memory 1410 such as the PRS configuration unit 1412. A means for generating assistance data for the UE based on the configuration parameters, the assistance data comprising the muting configuration may be, e.g., the one or more processors 1404 with dedicated hardware or implementing executable code or software instructions in memory 1410 such as the assistance data unit 1414. A means for sending the assistance data to the UE may be, e.g., the external interface 1402 and one or more processors 1404 with dedicated hardware or implementing executable code or software instructions in memory 1410 such as the assistance data transmission unit 1416. A means for receiving location information from the UE, where the location information is based on at least one location measurement for the PRS, where the at least one location measurement is based on the muting configuration may be, e.g., the external interface 1402 and one or more processors 1404 with dedicated hardware or implementing executable code or software instructions in memory 1410 such as the location information receive unit 1418. The location server may further include a means for determining a location for the UE based at least in part on the location information, which may be, e.g., the one or more processors 1404 with dedicated hardware or implementing executable code or software instructions in memory 1410 such as the location determination unit 1420. In one implementation, the means for determining the configuration parameters for the PRS includes means for sending an information request to the base station; and means for receiving an information response from the base station, the information response including the configuration parameters for the PRS, which may be, e.g., the external interface 1402 and one or more processors 1404 with dedicated hardware or implementing executable code or software instructions in memory 1410 such as the PRS configuration unit 1412.

Figure 15:
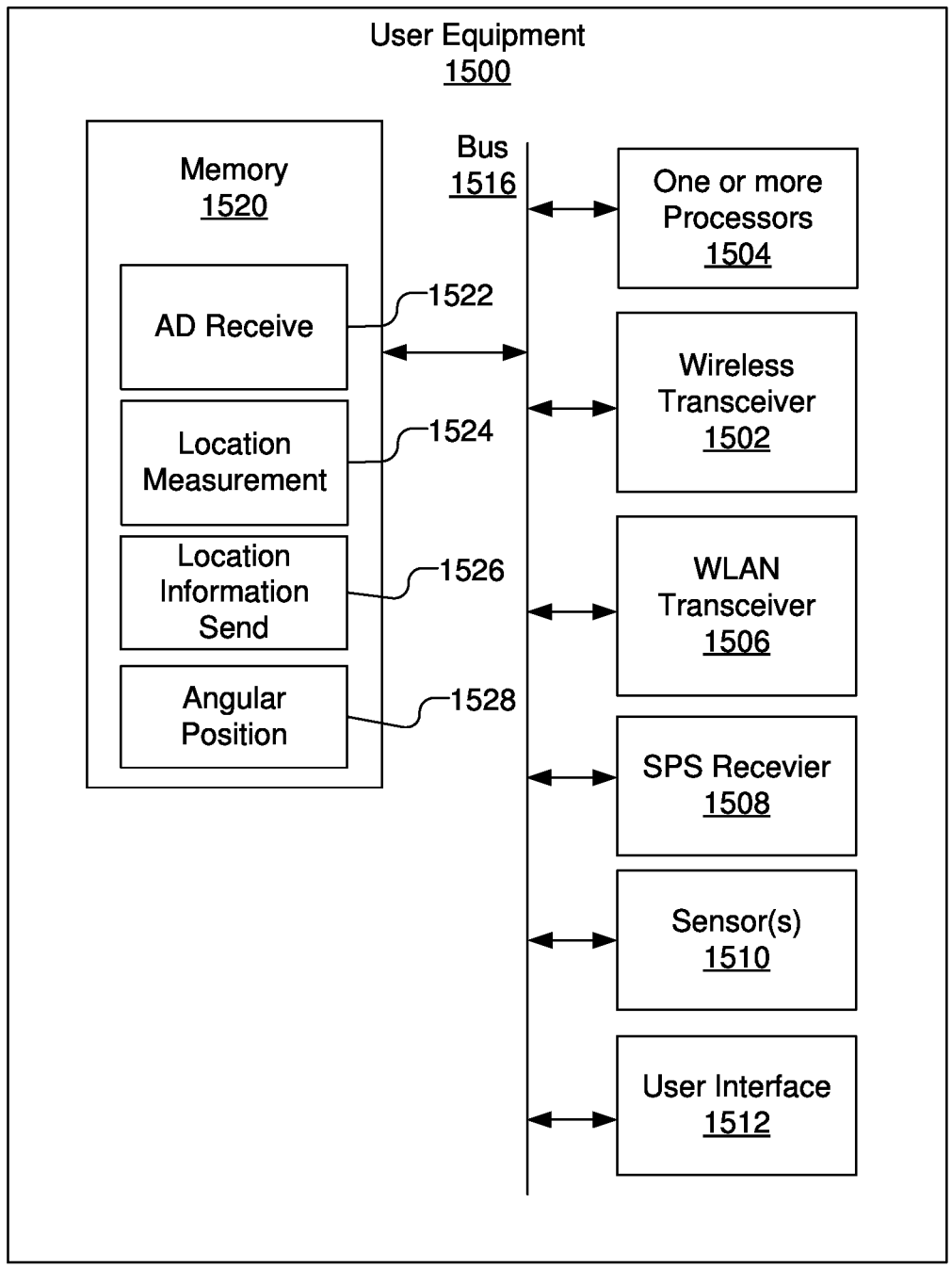
FIG. 15 is a block diagram of an embodiment of a UE capable of supporting location services for the UE.

FIG. 15 is a diagram illustrating an example of a hardware implementation of a UE 1500, such as UE 105 shown in FIGS. 1-3 and FIGS. 9-10. The UE 1500 may include a wireless transceiver 1502 to wirelessly communicate with an NG-RAN 112, e.g., base stations such as gNB 110 or ng-eNB 114 (shown in FIGS. 2-3). The UE 1500 may also include additional transceivers, such a wireless local area network (WLAN) transceiver 1506, as well as an SPS receiver 1508 for receiving and measuring signals from SPS SVs 190 (shown in FIGS. 1-3). The UE 1500 may further include one or more sensors 1510, such as cameras, accelerometers, gyroscopes, electronic compass, magnetometer, barometer, etc. The UE 1500 may further include a user interface 1512 that may include e.g., a display, a keypad or other input device, such as virtual keypad on the display, through which a user may interface with the UE 1500. The UE 1500 further includes one or more processors 1504 and memory 1520, which may be coupled together with bus 1516. The one or more processors 1504 and other components of the UE 1500 may similarly be coupled together with bus 1516, a separate bus, or may be directly connected together or coupled using a combination of the foregoing. The memory 1520 may contain executable code or software instructions that when executed by the one or more processors 1504 cause the one or more processors to operate as a special purpose computer programmed to perform the procedures and techniques disclosed herein.

As illustrated in FIG. 15, the memory 1520 may include one or more components or modules that may be implemented by the one or more processors 1504 to perform the methodologies described herein. While the components or modules are illustrated as software in memory 1520 that is executable by the one or more processors 1504, it should be understood that the components or modules may be dedicated hardware or firmware either in the one or more processors 1504 or off the processors. As illustrated, the memory 1520 may include an assistance data (AD) receive unit 1522 that configures the one or more processors 1504 to receive assistance data, via wireless transceiver 1502 from a location server (e.g. LMF 152) based on configuration parameters for a Positioning Reference Signal (PRS) transmitted by a base station, the configuration parameters comprising a muting configuration, the muting configuration comprising a time based and angle based muting pattern. The assistance data may be received as part of a message, e.g., an LPP Provide Assistance Data message from the location server, or may be received as a broadcast from a base station, which receives the assistance data from the location server. A location measurement unit 1524 configures the one or more processors 1504 to generate location measurements comprising at least one location measurement for the PRS, where the at least one location measurement is based on the muting configuration. A location information send unit 1526 configures the one or more processors 1504 to send, e.g., via the wireless transceiver, location information to the location server for location determination of the UE, where the location information is based on the at least one location measurement. Additionally, the memory 1520 may include an angular position unit 1528 that configures the one or more processors 1504 to determine an angular position with respect to a base station, e.g., based on signals received via the wireless transceiver 1502 and/or SPS receiver 1508, wherein the location measurement unit 1524 may configure the one or more processors 1504 to use the angular position along with the angle based muting pattern for the base station to generate the at least one location measurement.

The methodologies described herein may be implemented by various means depending upon the application. For example, these methodologies may be implemented in hardware, firmware, software, or any combination thereof. For a hardware implementation, the one or more processors 1504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1520) and executed by one or more processors 1504, causing the one or more processors 1504 to operate as a special purpose computer programmed to perform the techniques disclosed herein. Memory may be implemented within the one or processors 1504 or external to the one or more processors 1504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1500 may be stored as one or more instructions or code on a non-transitory computer-readable storage medium such as memory 1520. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1500 may be provided as signals on transmission media included in a communication apparatus. For example, a communication apparatus comprising part or all of UE 1500 may include a transceiver having signals indicative of instructions and data. The instructions and data are stored on non-transitory computer readable media, e.g., memory 1520, and are configured to cause the one or more processors 1504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE, such as UE 1500, capable of supporting location services for a UE may include means for receiving assistance data from a location server based on configuration parameters for a Positioning Reference Signal (PRS) transmitted by a base station, the configuration parameters comprising a muting configuration, the muting configuration comprising a time based and angle based muting pattern which may be, e.g., the wireless transceiver 1502 and one or more processors 1504 with dedicated hardware or implementing executable code or software instructions in memory 1520 such as the assistance data receive unit 1522. Means for generating location measurements comprising at least one location measurement for the PRS, wherein the at least one location measurement is based on the muting configuration may be, e.g., the wireless transceiver 1502 and one or more processors 1504 with dedicated hardware or implementing executable code or software instructions in memory 1520 such as the location measurement unit 1524. A means for sending location information to the location server for location determination of the UE, where the location information is based on the at least one location measurement, may be, e.g., the wireless transceiver 1502 and one or more processors 1504 with dedicated hardware or implementing executable code or software instructions in memory 1520 such as the location information send unit 1526. In one implementation, the means for generating the location measurements comprising the at least one location measurement for the PRS includes means for determining an angular position with respect to the base station, which may be, e.g., one or more processors 1504 with dedicated hardware or implementing executable code or software instructions in memory 1520 such as the angular position unit 1528, and means for using the angular position along with the angle based muting pattern for the base station to generate the at least one location measurement, which may be, e.g., the one or more processors 1504 with dedicated hardware or implementing executable code or software instructions in memory 1520 such as the location measurement unit 1524.

Figure 16:
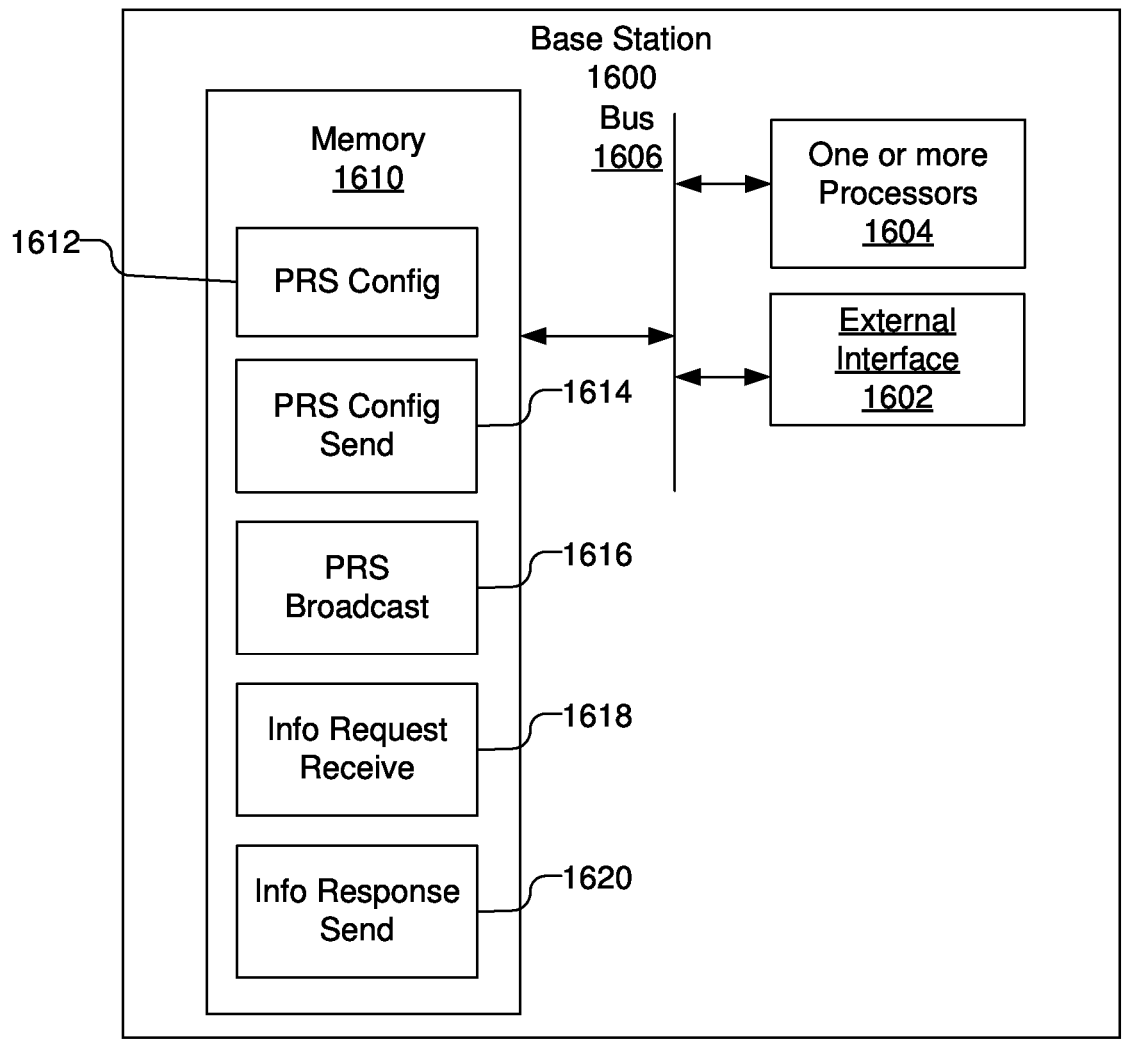
FIG. 16 is a block diagram of an embodiment of a base station capable of supporting location services for a UE.

FIG. 16 is a diagram illustrating an example of a hardware implementation of a base station 1600, such as gNB 110 or ng-eNB 114 shown in FIGS. 2-3. The base station 1600 includes, e.g., hardware components such as an external interface 1602, which may be a wired and/or wireless interface capable of connecting to an LMF, such as LMF 152 shown in FIGS. 2-3, and capable of wirelessly connecting to UE 105. The base station 1600 includes one or more processors 1604 and memory 1610, which may be coupled together with bus 1606. The memory 1610 may contain executable code or software instructions that when executed by the one or more processors 1604 cause the one or more processors 1604 to operate as a special purpose computer programmed to perform the procedures and techniques disclosed herein.

As illustrated in FIG. 16, the memory 1610 includes one or more components or modules that when implemented by the one or more processors 1604 implements the methodologies as described herein. While the components or modules are illustrated as software in memory 1610 that is executable by the one or more processors 1604, it should be understood that the components or modules may be dedicated hardware or firmware either in the processor or off processor. As illustrated, the memory 1610 may include a PRS configuration unit 1612 that causes the one or more processors 1604 to generate configuration parameters for a Positioning Reference Signal (PRS) transmitted by the base station, the configuration parameters comprising a muting configuration, the muting configuration comprising a time based and angle based muting pattern. A PRS configuration send unit 1614 configures the one or more processors 1604 to send, via the external interface 1602, the configuration parameters for the PRS including the muting configuration to a location server (e.g. LMF 152). A PRS broadcast unit 1616 configures the one or more processors 1604 to broadcast, via the external interface 1602, the PRS using the muting configuration comprising the time based and angle based muting pattern. An information request receive unit 1618 configures the one or more processors 1604 to receive, via the external interface 1602, an information request from the location server. An information response send unit 1620 configures the one or more processors 1604 to send, via the external interface 1602, an information response to the location server, the information response including the configuration parameters for the PRS.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1610, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station, such as base station 1600, capable of supporting location services for a UE, such as UE 105, and may include a means for generating configuration parameters for a Positioning Reference Signal (PRS) transmitted by the base station, the configuration parameters comprising a muting configuration, the muting configuration comprising a time based and angle based muting pattern, which may be, e.g., the one or more processors 1604 with dedicated hardware or implementing executable code or software instructions in memory 1610 such as the PRS configuration unit 1612. A means for sending the configuration parameters for the PRS including the muting configuration to a location server may include, e.g., the external interface 1602 and one or more processors 1604 with dedicated hardware or implementing executable code or software instructions in memory 1610 such as the PRS configuration send unit 1614. A means for broadcasting the PRS using the muting configuration comprising the time based and angle based muting pattern may be, e.g., the external interface 1602 and one or more processors 1604 with dedicated hardware or implementing executable code or software instructions in memory 1610 such as the PRS broadcast unit 1616. In one implementation, the base station may further include a means for receiving an information request from the location server, which may be, e.g., the external interface 1602 and one or more processors 1604 with dedicated hardware or implementing executable code or software instructions in memory 1610 such as the information request receive unit 1618, and a means for sending an information response to the location server, the information response including the configuration parameters for the PRS, which may be, e.g., e.g., the external interface 1602 and one or more processors 1604 with dedicated hardware or implementing executable code or software instructions in memory 1610 such as the information response send unit 1620.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method for supporting location services for a user equipment (UE) performed by a location server comprising: determining configuration parameters for a Positioning Reference Signal (PRS) transmitted by a base station, the configuration parameters comprising a muting configuration, the muting configuration comprising a time based and angle based muting pattern; generating assistance data for the UE based on the configuration parameters, the assistance data comprising the muting configuration; sending the assistance data to the UE; and receiving location information from the UE, wherein the location information is based on at least one location measurement for the PRS, wherein the at least one location measurement is based on the muting configuration.

There may be some implementations (2) of the above described method (1), wherein sending the assistance data to the UE comprises sending the assistance data to the UE as part of a message to the UE.

There may be some implementations (3) of the above described method (1), wherein sending the assistance data to the UE comprises sending the assistance data to the base station and the base station broadcasts the assistance data to the UE.

There may be some implementations (4) of the above described method (1), further comprising determining a location for the UE based at least in part on the location information.

There may be some implementations (5) of the above described method (4), wherein the location information comprises the at least one location measurement or the location.

There may be some implementations (6) of the above described method (1), wherein the base station is a New Radio (NR) NodeB (gNB) or a Next Generation evolved NodeB (ng-eNB) in a Fifth Generation (5G) wireless network and the location server is a Location Management Function (LMF).

There may be some implementations (7) of the above described method (1), wherein the PRS is transmitted by the base station in a plurality of different directions and at a plurality of different times.

There may be some implementations (8) of the above described method (7), wherein the PRS is transmitted in different directions in the plurality of different directions at the same times in the plurality of different times.

There may be some implementations (9) of the above described method (7), wherein the PRS is transmitted in different directions in the plurality of different directions at different times in the plurality of different times.

There may be some implementations (10) of the above described method (7), wherein the time based and angle based muting pattern comprises an indication, for each direction in the plurality of different directions and for each time in the plurality of different times, as to whether the PRS is transmitted or muted by the base station.

There may be some implementations (11) of the above described method (1), wherein determining the configuration parameters for the PRS further comprises: sending an information request to the base station; and receiving an information response from the base station, the information response including the configuration parameters for the PRS.

There may be some implementations (12) of the above described method (11), wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

There may be some implementations (13) of the above described method (1), wherein the time based and angle based muting pattern comprises a time based muting pattern comprising a plurality of beam sweeps wherein each beam sweep has an angular based muting pattern indicating an angular range at which the PRS signal is muted, and wherein the plurality of beam sweeps use one or more angular based muting patterns.

There may be some implementations (14) of the above described method (13), wherein the time based muting pattern and one or more angular based muting patterns are configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep.

There may be some implementations (15) of the above described method (1), wherein the base station transmits multiple beams simultaneously, each beam being transmitted in a different angular range, wherein the time based and angle based muting pattern comprises independently scheduled time based muting patterns for beams being transmitted in the different angular range.

There may be some implementations (16) of the above described method (15), wherein the independently scheduled time based muting patterns for the beams being transmitted in the different angular range are configured to reduce interference between the PRS signals from separate beams being transmitted simultaneously by the base station.

There may be some implementations (17) of the above described method (15), wherein the independently scheduled time based muting pattern for each beam is configured to reduce any interference from PRS signals from beams transmitted by other base stations.

There may be some implementations (18) of the above described method (1), wherein the time based and angle based muting pattern is defined by a two-dimensional muting pattern across time and angular direction.

There may be some implementations (19) of the above described method (1), wherein the at least one location measurement comprises one or more of a Reference Signal Time Difference (RSTD), a Receive-Transmit (Rx-Tx) time difference, an Angle of Arrival (AOA), an Angle of Departure (AOD), a Reference Signal Received Power (RSRP), and a Reference Signal Received Quality (RSRQ).

One implementation (20) may be a location server for supporting location services for a user equipment (UE), the location server comprising: an external interface configured to communicate with a wireless network; at least one memory; and at least one processor coupled to the external interface and the at least one memory and configured to: determine configuration parameters for a Positioning Reference Signal (PRS) transmitted by a base station, the configuration parameters comprising a muting configuration, the muting configuration comprising a time based and angle based muting pattern; generate assistance data for the UE based on the configuration parameters, the assistance data comprising the muting configuration; send the assistance data to the UE via the external interface; and receive location information from the UE via the external interface, wherein the location information is based on at least one location measurement for the PRS, wherein the at least one location measurement is based on the muting configuration.

There may be some implementations (21) of the above described location server (20), wherein the at least one processor is configured to send the assistance data to the UE by being configured to send the assistance data to the UE as part of a message to the UE.

There may be some implementations (22) of the above described location server (20), wherein the at least one processor is configured to send the assistance data to the UE by being configured to send the assistance data to the base station and the base station broadcasts the assistance data to the UE.

There may be some implementations (23) of the above described location server (20), wherein the at least one processor is further configured to determine a location for the UE based at least in part on the location information.

There may be some implementations (24) of the above described location server (23), wherein the location information comprises the at least one location measurement or the location.

There may be some implementations (25) of the above described location server (20), wherein the base station is a New Radio (NR) NodeB (gNB) or a Next Generation evolved NodeB (ng-eNB) in a Fifth Generation (5G) wireless network and the location server is a Location Management Function (LMF).

There may be some implementations (26) of the above described location server (20), wherein the PRS is transmitted by the base station in a plurality of different directions and at a plurality of different times.

There may be some implementations (27) of the above described location server (26), wherein the PRS is transmitted in different directions in the plurality of different directions at the same times in the plurality of different times.

There may be some implementations (28) of the above described location server (26), wherein the PRS is transmitted in different directions in the plurality of different directions at different times in the plurality of different times.

There may be some implementations (29) of the above described location server (26), wherein the time based and angle based muting pattern comprises an indication for each direction in the plurality of different directions and for each time in the plurality of different times, as to whether the PRS is transmitted or muted by the base station.

There may be some implementations (30) of the above described location server (20), wherein the at least one processor is configured to determine the configuration parameters for the PRS by being configured to: send an information request to the base station via the external interface; and receive an information response from the base station via the external interface, the information response including the configuration parameters for the PRS.

There may be some implementations (31) of the above described location server (30), wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

There may be some implementations (32) of the above described location server (20), wherein the time based and angle based muting pattern comprises a time based muting pattern comprising a plurality of beam sweeps wherein each beam sweep has an angular based muting pattern indicating an angular range at which the PRS signal is muted, and wherein the plurality of beam sweeps use one or more angular based muting patterns.

There may be some implementations (33) of the above described location server (32), wherein the time based muting pattern and one or more angular based muting patterns are configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep.

There may be some implementations (34) of the above described location server (20), wherein the base station transmits multiple beams simultaneously, each beam being transmitted in a different angular range, wherein the time based and angle based muting pattern comprises independently scheduled time based muting patterns for beams being transmitted in the different angular range.

There may be some implementations (35) of the above described location server (34), wherein the independently scheduled time based muting patterns for the beams being transmitted in the different angular range are configured to reduce interference between the PRS signals from separate beams being transmitted simultaneously by the base station.

There may be some implementations (36) of the above described location server (34), wherein the independently scheduled time based muting pattern for each beam is configured to reduce any interference from PRS signals from beams transmitted by other base stations.

There may be some implementations (37) of the above described location server (20), wherein the time based and angle based muting pattern is defined by a two-dimensional muting pattern across time and angular direction.

There may be some implementations (38) of the above described location server (20), wherein the at least one location comprises one or more of a Reference Signal Time Difference (RSTD), a Receive-Transmit (Rx-Tx) time difference, an Angle of Arrival (AOA), an Angle of Departure (AOD), a Reference Signal Received Power (RSRP), and a Reference Signal Received Quality (RSRQ).

One implementation (39) may be a method for supporting location services for a user equipment (UE) performed by a base station comprising: generating configuration parameters for a Positioning Reference Signal (PRS) transmitted by the base station, the configuration parameters comprising a muting configuration, the muting configuration comprising a time based and angle based muting pattern; sending the configuration parameters for the PRS including the muting configuration to a location server; and broadcasting the PRS using the muting configuration comprising the time based and angle based muting pattern.

There may be some implementations (40) of the above described method (39), wherein the base station is a New Radio (NR) NodeB (gNB) or a Next Generation evolved NodeB (ng-eNB) in a Fifth Generation (5G) wireless network and the location server is a Location Management Function (LMF).

There may be some implementations (41) of the above described method (39), wherein the PRS is broadcast by the base station in a plurality of different directions and at a plurality of different times.

There may be some implementations (42) of the above described method (41), wherein the PRS is transmitted in different directions in the plurality of different directions at the same times in the plurality of different times.

There may be some implementations (43) of the above described method (41), wherein the PRS is transmitted in different directions in the plurality of different directions at different times in the plurality of different times.

There may be some implementations (44) of the above described method (41), wherein the time based and angle based muting pattern comprises an indication, for each direction in the plurality of different directions and for each time in the plurality of different times, as to whether the PRS is transmitted or muted by the base station.

There may be some implementations (45) of the above described method (39), further comprising: receiving an information request from the location server; and sending an information response to the location server, the information response including the configuration parameters for the PRS.

There may be some implementations (46) of the above described method (45), wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

There may be some implementations (47) of the above described method (39), wherein the time based and angle based muting pattern comprises a time based muting pattern comprising a plurality of beam sweeps wherein each beam sweep has an angular based muting pattern indicating an angular range at which the PRS signal is muted, and wherein the plurality of beam sweeps use one or more angular based muting patterns.

There may be some implementations (48) of the above described method (47), wherein the time based muting pattern and one or more angular based muting patterns are configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep.

There may be some implementations (49) of the above described method (39), wherein the base station transmits multiple beams simultaneously, each beam being transmitted in a different angular range, wherein the time based and angle based muting pattern comprises independently scheduled time based muting patterns for beams being transmitted in the different angular range.

There may be some implementations (50) of the above described method (49), wherein the independently scheduled time based muting patterns for the beams being transmitted in the different angular range are configured to reduce interference between the PRS signals from separate beams being transmitted simultaneously by the base station.

There may be some implementations (51) of the above described method (49), wherein the independently scheduled time based muting pattern for each beam is configured to reduce any interference from PRS signals from beams transmitted by other base stations.

There may be some implementations (52) of the above described method (39), wherein the time based and angle based muting pattern is defined by a two-dimensional muting pattern across time and angular direction.

(One implementation (53) may be a base station capable of supporting location services for a user equipment (UE), the base station comprising: an external interface configured to communicate with a wireless network and to wirelessly broadcast signals; at least one memory; and at least one processor coupled to the external interface and the at least one memory and configured to: generate configuration parameters for a Positioning Reference Signal (PRS) transmitted by the base station, the configuration parameters comprising a muting configuration, the muting configuration comprising a time based and angle based muting pattern; send via the external interface the configuration parameters for the PRS including the muting configuration to a location server in the wireless network; and broadcast via the external interface the PRS using the muting configuration comprising the time based and angle based muting pattern.

There may be some implementations (54) of the above described base station (53), wherein the base station is a New Radio (NR) NodeB (gNB) or a Next Generation evolved NodeB (ng-eNB) in a Fifth Generation (5G) wireless network and the location server is a Location Management Function (LMF).

There may be some implementations (55) of the above described base station (53), wherein the PRS is broadcast by the base station in a plurality of different directions and at a plurality of different times.

There may be some implementations (56) of the above described base station (55), wherein the PRS is transmitted in different directions in the plurality of different directions at the same times in the plurality of different times.

There may be some implementations (57) of the above described base station (55), wherein the PRS is transmitted in different directions in the plurality of different directions at different times in the plurality of different times.

There may be some implementations (58) of the above described base station (55), wherein the time based and angle based muting pattern comprises an indication for each direction in the plurality of different directions and for each time in the plurality of different times, as to whether the PRS is transmitted or muted by the base station.

There may be some implementations (59) of the above described base station (53), wherein the at least one processor is further configured to: receive via the external interface an information request from the location server; and send via the external interface an information response to the location server, the information response including the configuration parameters for the PRS.

There may be some implementations (60) of the above described base station (59), wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

There may be some implementations (61) of the above described base station (53), wherein the time based and angle based muting pattern comprises a time based muting pattern comprising a plurality of beam sweeps wherein each beam sweep has an angular based muting pattern indicating an angular range at which the PRS signal is muted, and wherein the plurality of beam sweeps use one or more angular based muting patterns.

There may be some implementations (62) of the above described base station (61), wherein the time based muting pattern and one or more angular based muting patterns are configured so that a directional beam produced by the base station mutes the PRS signals at a first angular range at which the directional beam intersects a second directional beam with a non-muted PRS signal from a second base station during a first beam sweep and does not mute the PRS signal at the first angular range at which the directional beam intersects the second directional beam with a muted PRS signal from the second base station during a second beam sweep.

There may be some implementations (63) of the above described base station (53), wherein the base station transmits multiple beams simultaneously, each beam being transmitted in a different angular range, wherein the time based and angle based muting pattern comprises independently scheduled time based muting patterns for beams being transmitted in the different angular range.

There may be some implementations (64) of the above described base station (63), wherein the independently scheduled time based muting patterns for the beams being transmitted in the different angular range are configured to reduce interference between the PRS signals from separate beams being transmitted simultaneously by the base station.

There may be some implementations (65) of the above described base station (63), wherein the independently scheduled time based muting pattern for each beam is configured to reduce any interference from PRS signals from beams transmitted by other base stations.

There may be some implementations (66) of the above described base station (53), wherein the time based and angle based muting pattern is defined by a two-dimensional muting pattern across time and angular direction.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) performed by a base station comprising:
receiving assistance data from a location server, the assistance data based on configuration parameters for Positioning Reference Signal (PRS), the configuration parameters comprising a muting configuration, the muting configuration comprising a time based and angle based muting pattern;
broadcasting the assistance data received from the location server; and
broadcasting the PRS using the muting configuration comprising the time based and angle based muting pattern.

2. The method of claim 1, wherein the base station is a New Radio (NR) NodeB (gNB) or a Next Generation evolved NodeB (ng-eNB) in a Fifth Generation (5G) wireless network and the location server is a Location Management Function (LMF).

3. The method of claim 1, wherein the PRS is broadcast by the base station in a plurality of different directions and at a plurality of different times, and wherein the time based and angle based muting pattern comprises an indication for each direction in the plurality of different directions and for each time in the plurality of different times, as to whether the PRS is broadcast or muted by the base station.

4. The method of claim 1, wherein the assistance data is broadcast periodically.

5. The method of claim 1, further comprising receiving a request for assistance data, wherein the assistance data is broadcast in response to the request for assistance data.

6. The method of claim 1, further comprising:
generating the configuration parameters for the PRS including the muting configuration;
sending the configuration parameters for the PRS including the muting configuration to the location server.

7. The method of claim 6, further comprising:
receiving an information request from the location server; and
sending an information response to the location server, the information response including the configuration parameters for the PRS.

8. The method of claim 7, wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

9. The method of claim 1, wherein the time based and angle based muting pattern comprises a time based muting pattern comprising a plurality of beam sweeps wherein each beam sweep has an angular based muting pattern indicating an angular range at which the PRS is muted, and wherein the plurality of beam sweeps use one or more angular based muting patterns.

10. The method of claim 9, wherein the time based muting pattern and the one or more angular based muting patterns are configured so that a directional beam produced by the base station mutes the PRS at a first angular range at which the directional beam intersects a second directional beam with a non-muted PRS from a second base station during a first beam sweep and does not mute the PRS at the first angular range at which the directional beam intersects the second directional beam with a muted PRS from the second base station during a second beam sweep.

11. The method of claim 1, wherein the base station transmits multiple beams simultaneously, each beam being transmitted in a different angular range, wherein the time based and angle based muting pattern comprises independently scheduled time based muting patterns for beams being transmitted in the different angular range.

12. The method of claim 11, wherein the independently scheduled time based muting patterns for the beams being transmitted in the different angular range are configured to reduce interference between the PRS from separate beams being transmitted simultaneously by the base station.

13. The method of claim 11, wherein the independently scheduled time based muting pattern for each beam is configured to reduce any interference from PRS from beams transmitted by other base stations.

14. The method of claim 1, wherein the time based and angle based muting pattern is defined by a two-dimensional muting pattern across time and angular direction.

15. A base station capable of supporting location services for a user equipment (UE), the base station comprising:
    an external interface configured to communicate with a wireless network and to wirelessly broadcast signals;
    at least one memory; and
    at least one processor coupled to the external interface and the at least one memory and configured to:
        receiving via the external interface assistance data from a location server, the assistance data based on configuration parameters for a Positioning Reference Signal (PRS), the configuration parameters comprising a muting configuration, the muting configuration comprising a time based and angle based muting pattern;
        broadcast via the external interface the assistance data received from the location server; and
        broadcast via the external interface the PRS using the muting configuration comprising the time based and angle based muting pattern.

16. The base station of claim 15, wherein the base station is a New Radio (NR) NodeB (gNB) or a Next Generation evolved NodeB (ng-eNB) in a Fifth Generation (5G) wireless network and the location server is a Location Management Function (LMF).

17. The base station of claim 15, wherein the PRS is broadcast by the base station in a plurality of different directions and at a plurality of different times, and wherein the time based and angle based muting pattern comprises an indication for each direction in the plurality of different directions and for each time in the plurality of different times, as to whether the PRS is transmitted or muted by the base station.

18. The base station of claim 15, wherein the assistance data is broadcast periodically.

19. The base station of claim 15, wherein the at least one processor is further configured to receive via the external interface a request for assistance data, wherein the assistance data is broadcast in response to the request for assistance data.

20. The base station of claim 15, wherein the at least one processor is further configured to:
    generate the configuration parameters for the PRS including the muting configuration;
    send via the external interface the configuration parameters for the PRS including the muting configuration to the location server.

21. The base station of claim 20, wherein the at least one processor is further configured to:
    receive via the external interface an information request from the location server; and
    send via the external interface an information response to the location server, the information response including the configuration parameters for the PRS.

22. The base station of claim 21, wherein the information request and the information response are Long Term Evolution (LTE) Positioning Protocol A (LPPa) or New Radio Position Protocol A (NRPPa) messages for Observed Time Difference of Arrival (OTDOA) information and OTDOA information response.

23. The base station of claim 15, wherein the time based and angle based muting pattern comprises a time based muting pattern comprising a plurality of beam sweeps wherein each beam sweep has an angular based muting pattern indicating an angular range at which the PRS is muted, and wherein the plurality of beam sweeps use one or more angular based muting patterns.

24. The base station of claim 23, wherein the time based muting pattern and the one or more angular based muting patterns are configured so that a directional beam produced by the base station mutes the PRS at a first angular range at which the directional beam intersects a second directional beam with a non-muted PRS from a second base station during a first beam sweep and does not mute the PRS at the first angular range at which the directional beam intersects the second directional beam with a muted PRS from the second base station during a second beam sweep.

25. The base station of claim 15, wherein the base station transmits multiple beams simultaneously, each beam being transmitted in a different angular range, wherein the time based and angle based muting pattern comprises independently scheduled time based muting patterns for beams being transmitted in the different angular range.

26. The base station of claim 25, wherein the independently scheduled time based muting patterns for the beams being transmitted in the different angular range are configured to reduce interference between the PRS from separate beams being transmitted simultaneously by the base station.

27. The base station of claim 25, wherein the independently scheduled time based muting pattern for each beam is configured to reduce any interference from PRS from beams transmitted by other base stations.

28. The base station of claim 15, wherein the time based and angle based muting pattern is defined by a two-dimensional muting.

29. A base station capable of supporting location services for a user equipment (UE), the base station comprising:
    means for receiving assistance data from a location server, the assistance data based on configuration parameters for Positioning Reference Signal (PRS), the configuration parameters comprising a muting configuration, the muting configuration comprising a time based and angle based muting pattern;
    means for broadcasting the assistance data received from the location server; and
    means for broadcasting the PRS using the muting configuration comprising the time based and angle based muting pattern.

30. A non-transitory storage medium including program code stored thereon, the program code is operable to configure a base station for supporting location services for a user equipment, the program code comprising instructions to:
    receiving assistance data from a location server, the assistance data based on configuration parameters for Positioning Reference Signal (PRS), the configuration parameters comprising a muting configuration, the muting configuration comprising a time based and angle based muting pattern;
    broadcast the assistance data received from the location server; and broadcast the PRS using the muting configuration comprising the time based and angle based muting pattern.

* * * * *